(12) United States Patent
Oyaizu

(10) Patent No.: US 11,852,538 B2
(45) Date of Patent: Dec. 26, 2023

(54) TEMPERATURE ESTIMATION DEVICE, TEMPERATURE ESTIMATING METHOD, AND TEMPERATURE ESTIMATING PROGRAM

(71) Applicant: SONY CORPORATION, Tokyo (JP)

(72) Inventor: Hideki Oyaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 407 days.

(21) Appl. No.: 17/288,727

(22) PCT Filed: Oct. 15, 2019

(86) PCT No.: PCT/JP2019/040396
§ 371 (c)(1),
(2) Date: Apr. 26, 2021

(87) PCT Pub. No.: WO2020/095630
PCT Pub. Date: May 14, 2020

(65) Prior Publication Data
US 2021/0396587 A1   Dec. 23, 2021

(30) Foreign Application Priority Data
Nov. 5, 2018 (JP) .................. 2018-208225

(51) Int. Cl.
*G01J 5/06* (2022.01)
*G01J 5/48* (2022.01)
(Continued)

(52) U.S. Cl.
CPC .................. *G01J 5/06* (2013.01); *G01J 5/064* (2022.01); *G01J 5/48* (2013.01); *H04N 5/33* (2013.01);
(Continued)

(58) Field of Classification Search
CPC ...... G01J 5/06; G01J 5/064; G01J 5/48; G01J 5/068; G01J 5/53; G01J 5/80; G01J 5/0831; G01J 2005/106
See application file for complete search history.

(56) References Cited

FOREIGN PATENT DOCUMENTS

| JP | H08-181917 A | 7/1996 |
|---|---|---|
| JP | 2002-251609 A | 9/2002 |

(Continued)

OTHER PUBLICATIONS

Olivier Riou et al., Non Uniformity Correction and thermal drift compensation of thermal infrared camera, Proceedings of SPIE—The International Society for Optical Engineering, Apr. 2004, pp. 1-10.

(Continued)

*Primary Examiner* — David P Porta
*Assistant Examiner* — Meenakshi S Sahu
(74) *Attorney, Agent, or Firm* — Paratus Law Group, PLLC

(57) ABSTRACT

A temperature estimation device (100) is provided with: an acquiring section (131) that acquires a photographed image photographed by a photographing section (110) including an infrared light sensor and a housing; a generating section (132) that corrects the photographed image with use of a correction parameter and a temporarily set temperature of the housing to generate a corrected image of the photographed image, the correction parameter that is calculated by prior temperature calibration with respect to the photographing section (110); and an estimating section (135) that estimates a temperature of the housing on the basis of non-uniformity of luminance values of pixels included in the corrected image.

10 Claims, 15 Drawing Sheets

(51) Int. Cl.
*H04N 5/33* (2023.01)
*H04N 23/52* (2023.01)
*H04N 25/63* (2023.01)
*G01J 5/068* (2022.01)

(52) U.S. Cl.
CPC ............. *H04N 23/52* (2023.01); *H04N 25/63* (2023.01); *G01J 5/068* (2022.01)

(56) References Cited

FOREIGN PATENT DOCUMENTS

| JP | 2009-278551 A | 11/2009 |
|----|---------------|---------|
| JP | 2012-247381 A | 12/2012 |
| JP | 2013-118547 A | 6/2013 |
| JP | 2018-141778 A | 9/2018 |
| WO | WO 2017/073401 A1 | 5/2017 |

OTHER PUBLICATIONS

Vivek Boominathan et al., Lensless Imaging: A computational renaissance, IEEE Signal Processing Magazine, Sep. 2016, pp. 23-35, vol. 33, Issue 5, IEEE.

Evan L. Erickson et al., Miniature lensless computational infrared imager, IS&T International Symposium on Electronic Imaging, 2016, pp. 1-4, Society for Imaging Science and Technology.

[FIG. 1]
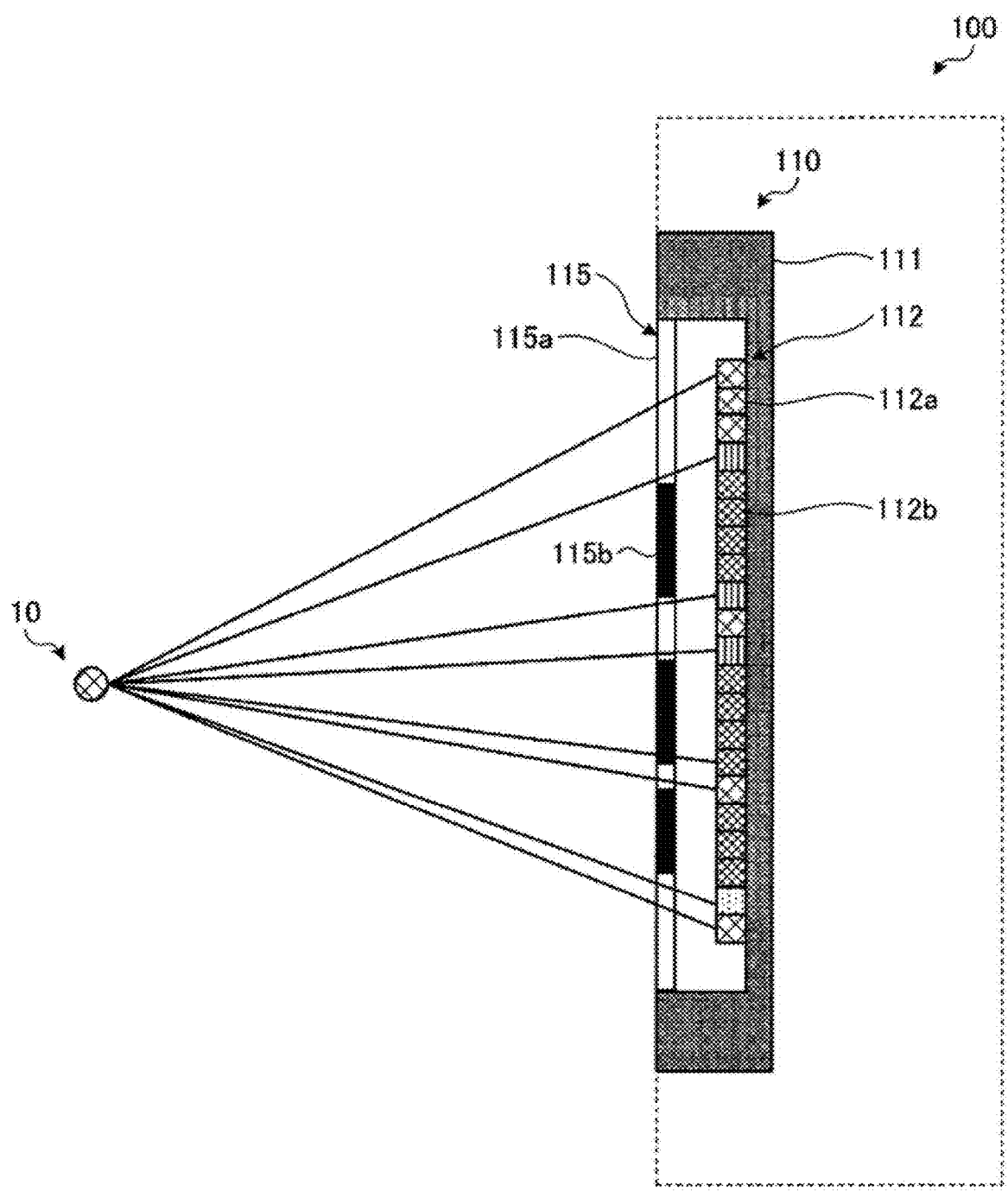

[FIG. 2]
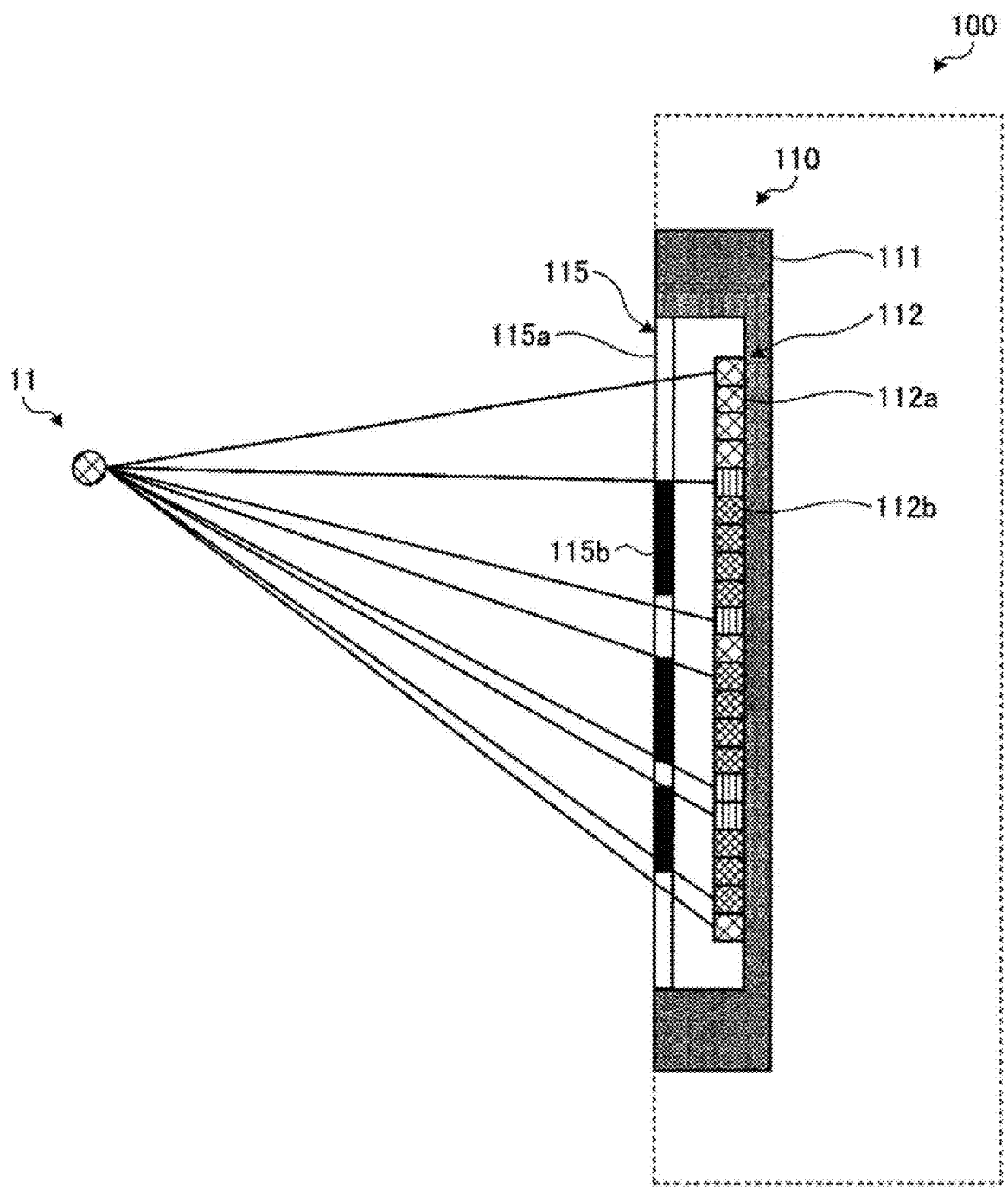

[FIG. 3]
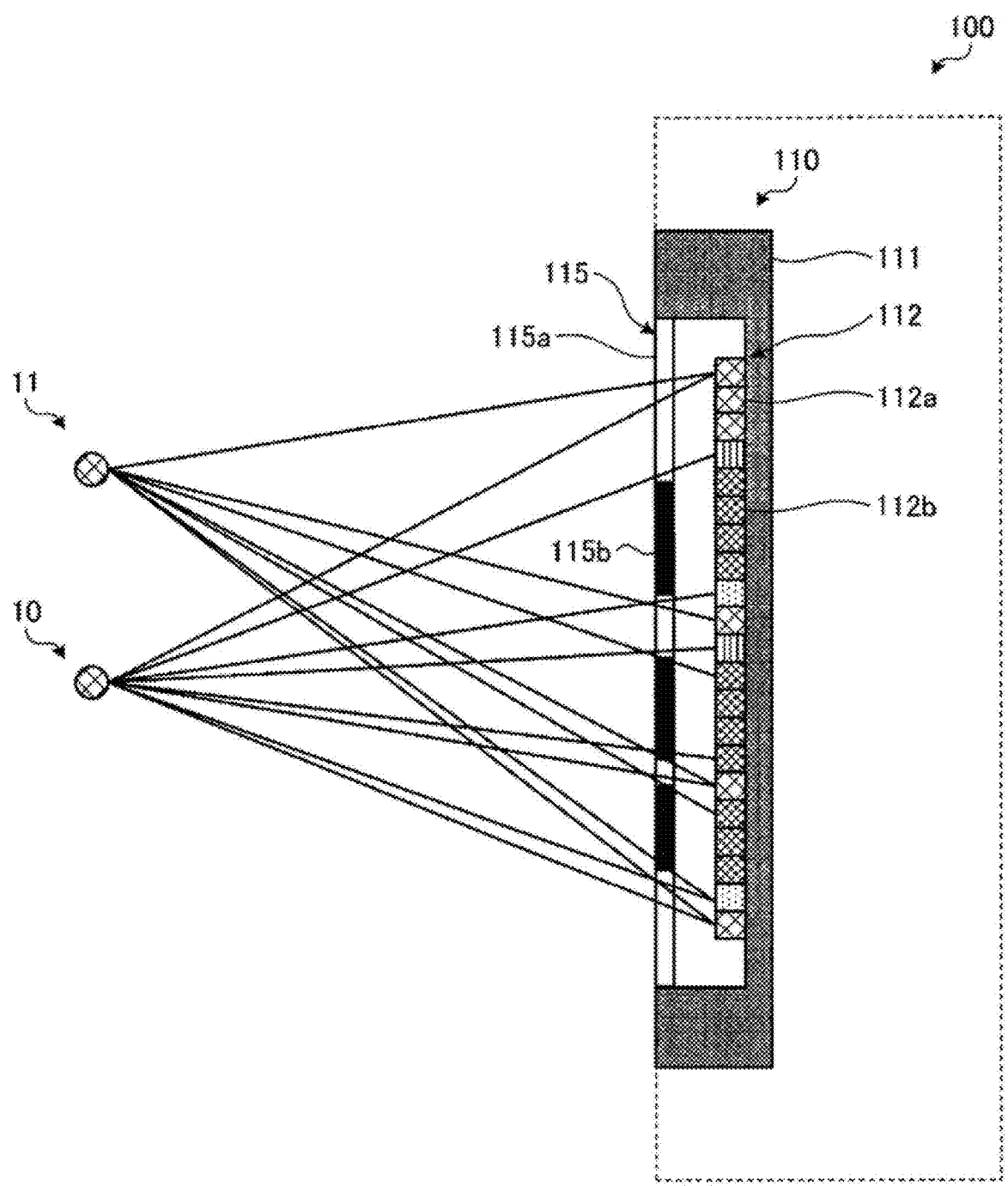

[FIG. 4]
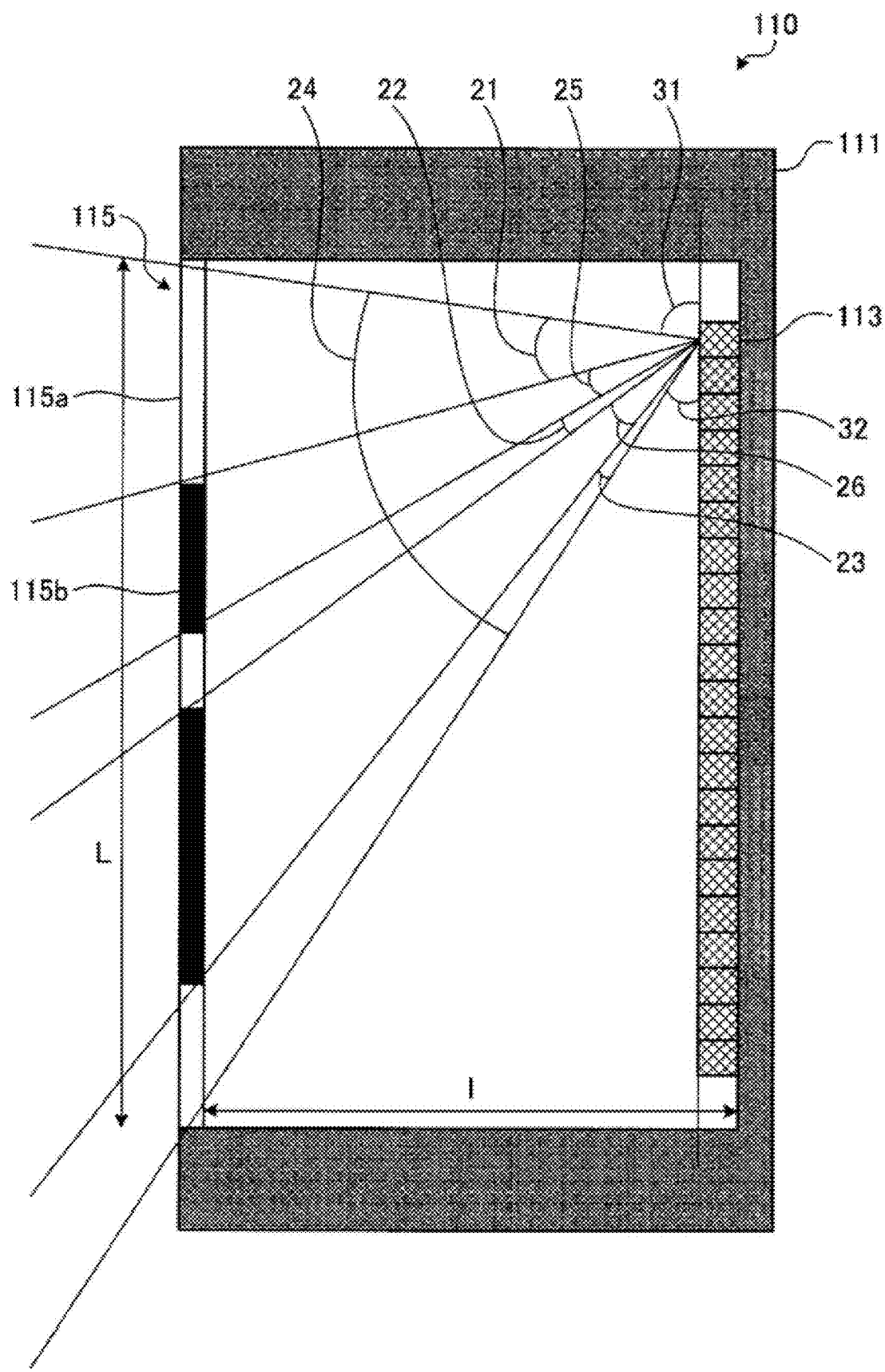

[FIG. 5]
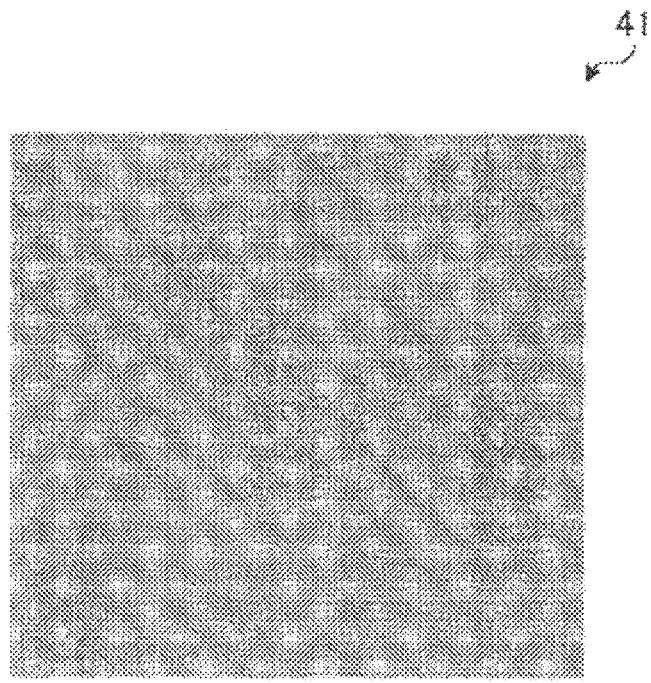
[FIG. 6]
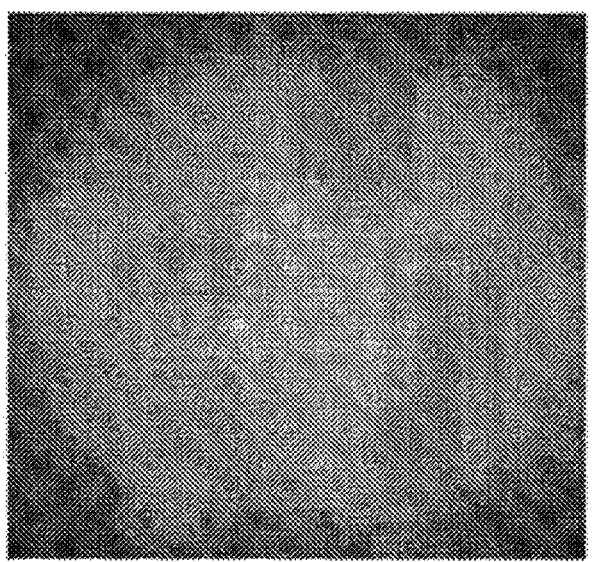

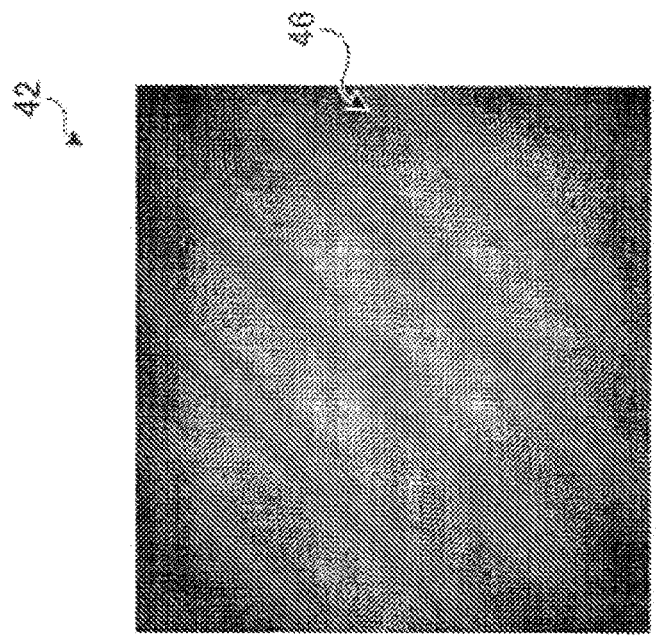
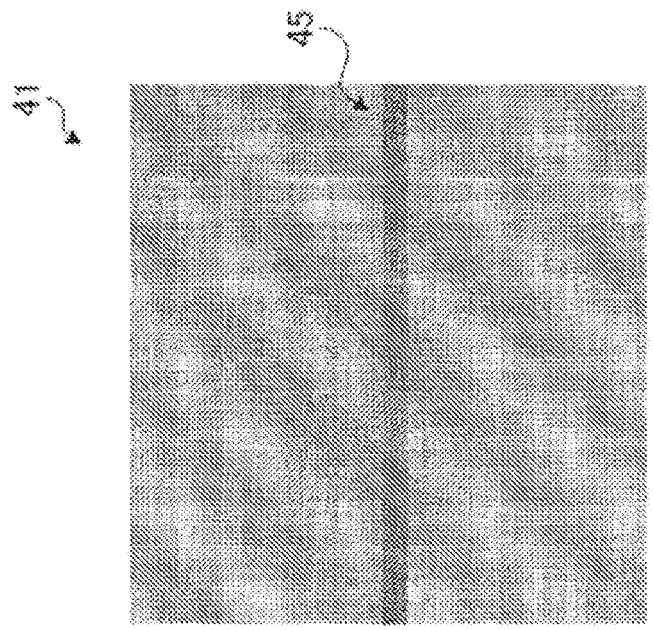
[FIG. 7]

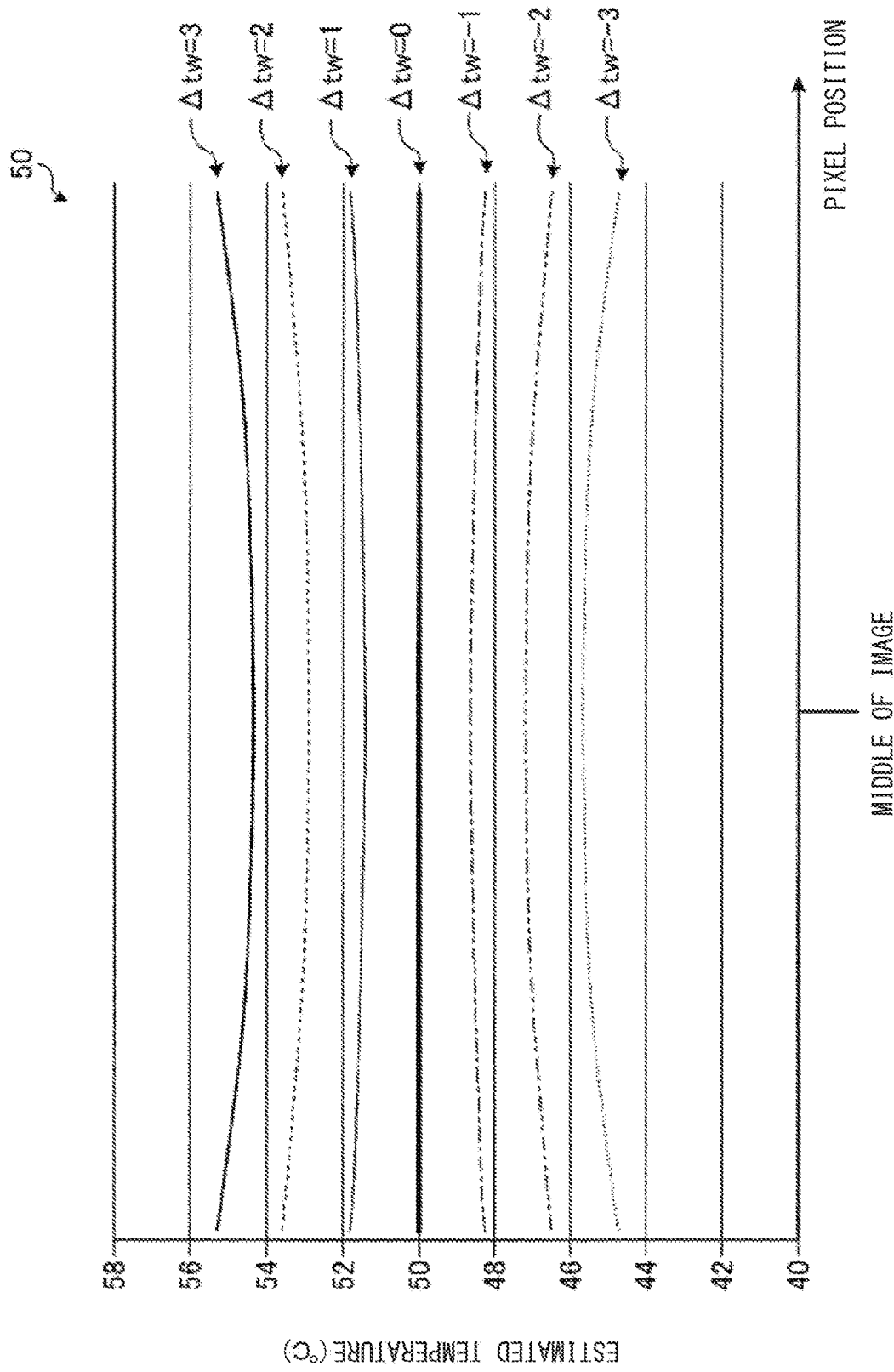
[FIG. 8]

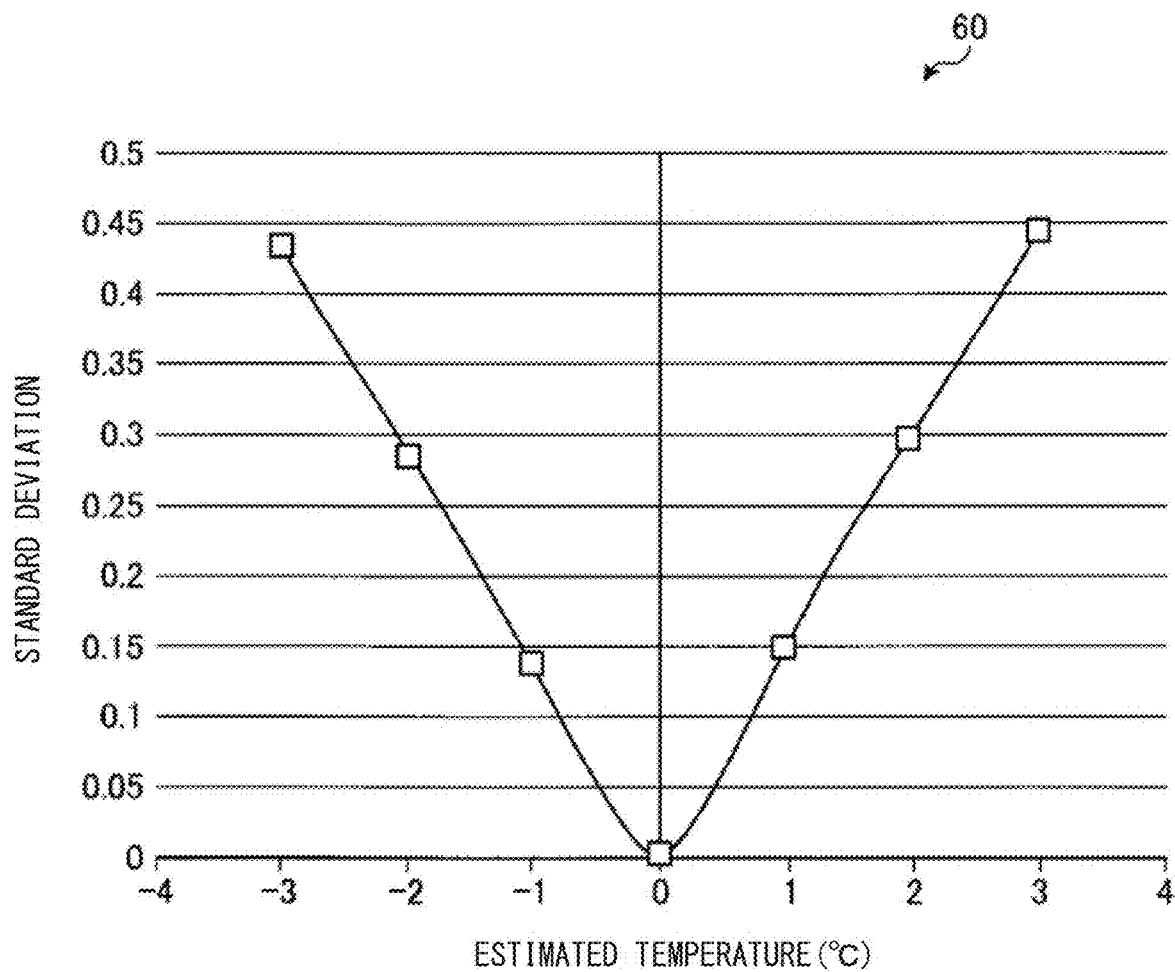
[FIG. 9]

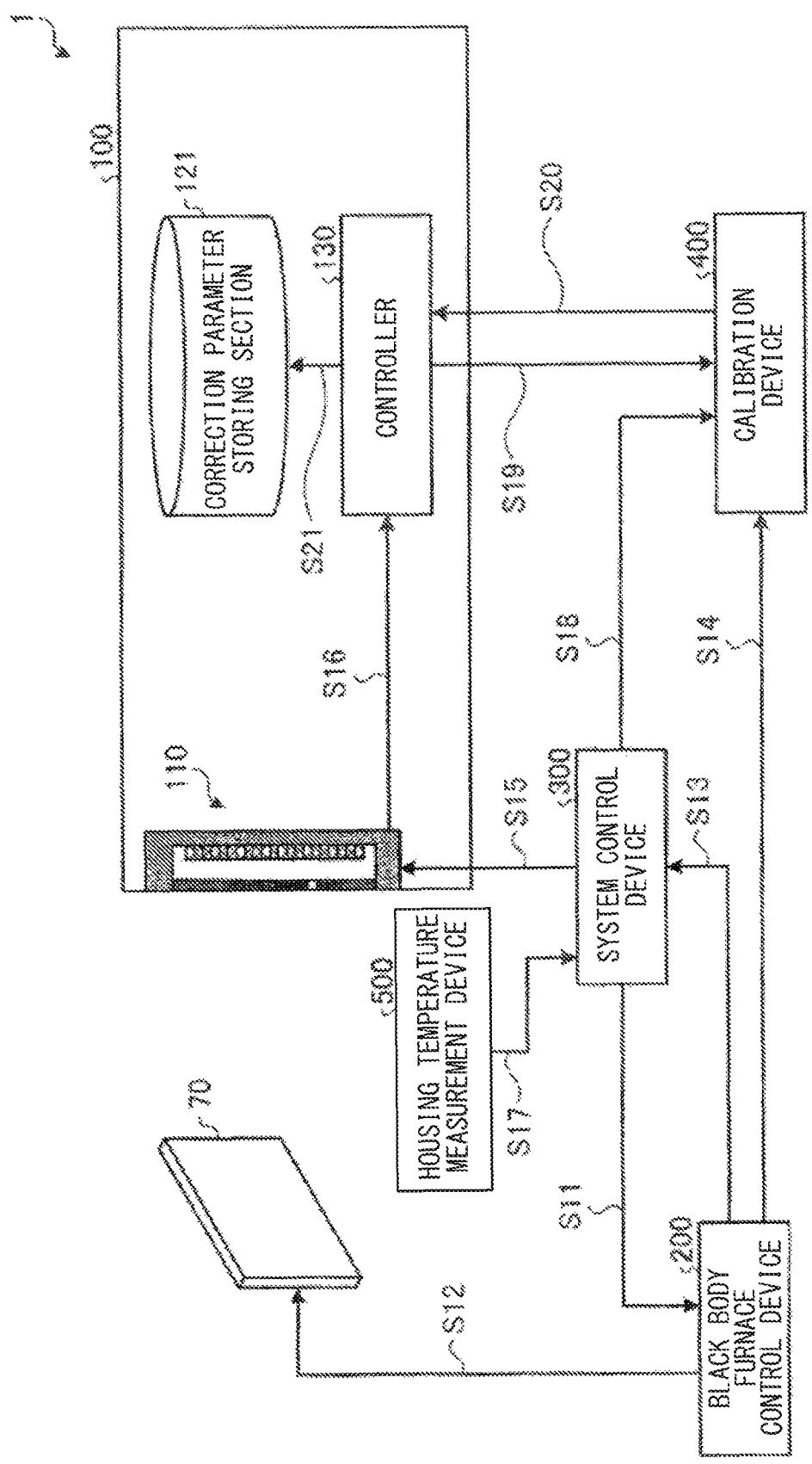
[FIG. 10]

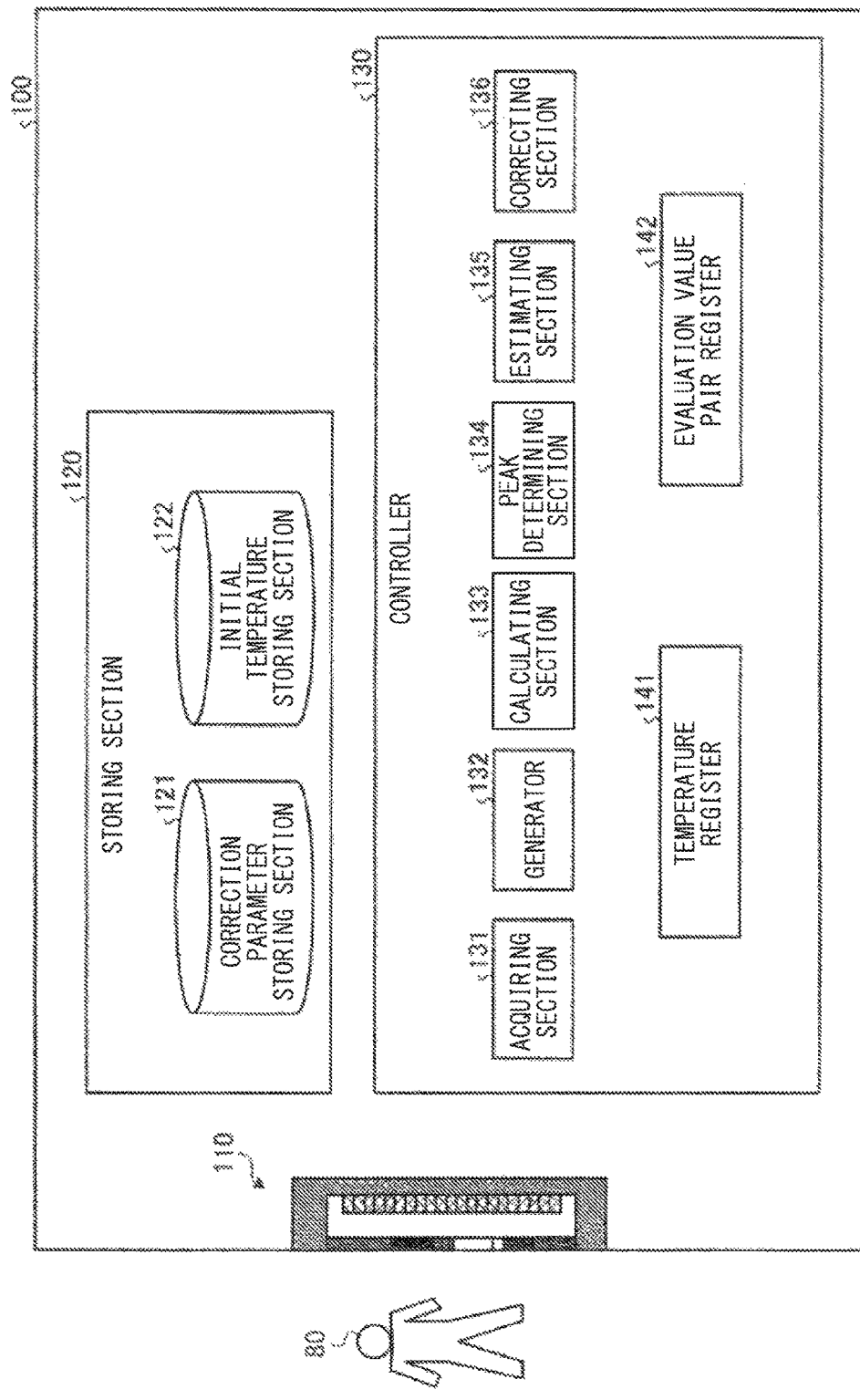
[FIG. 11]

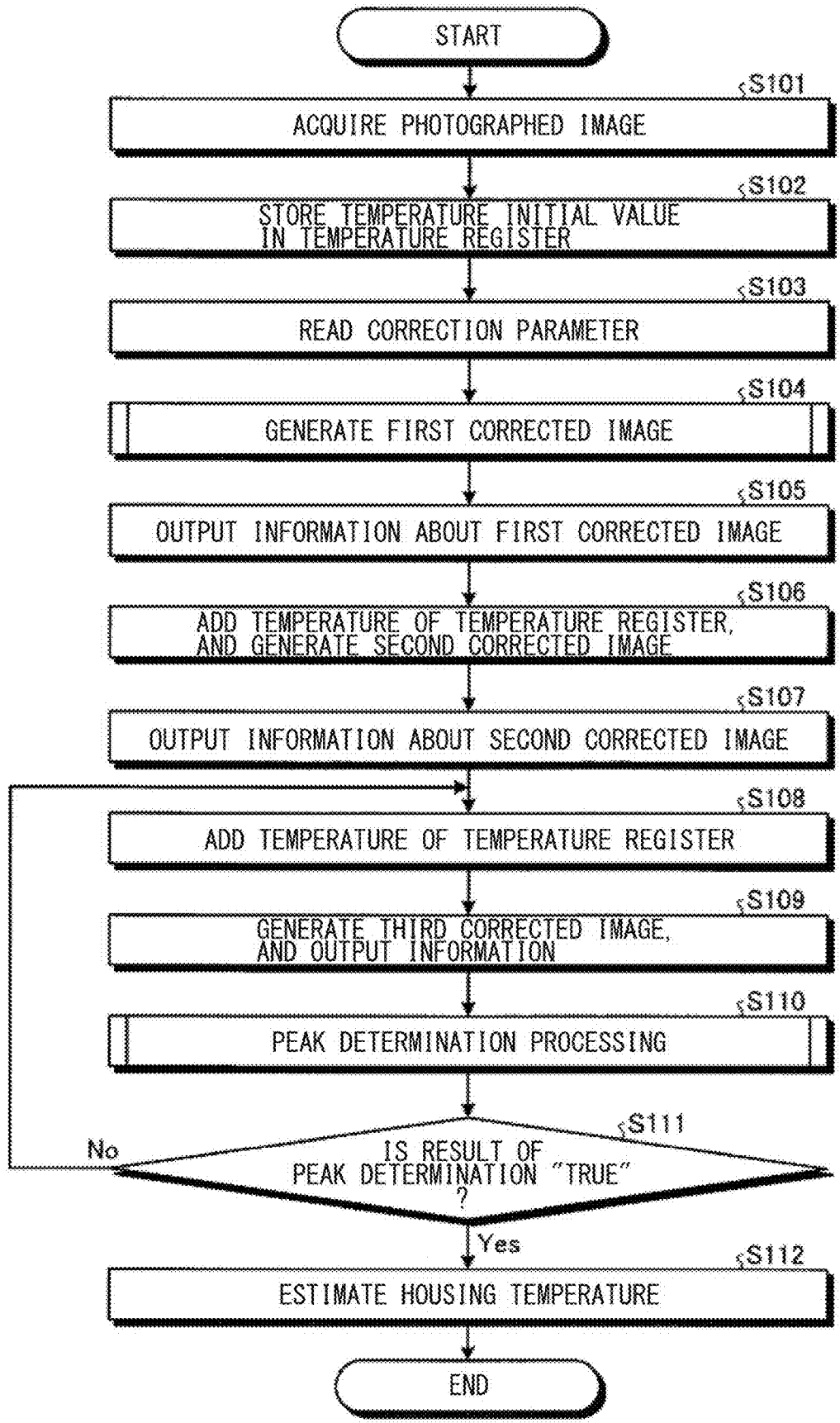
[FIG. 12]

[ FIG. 13 ]
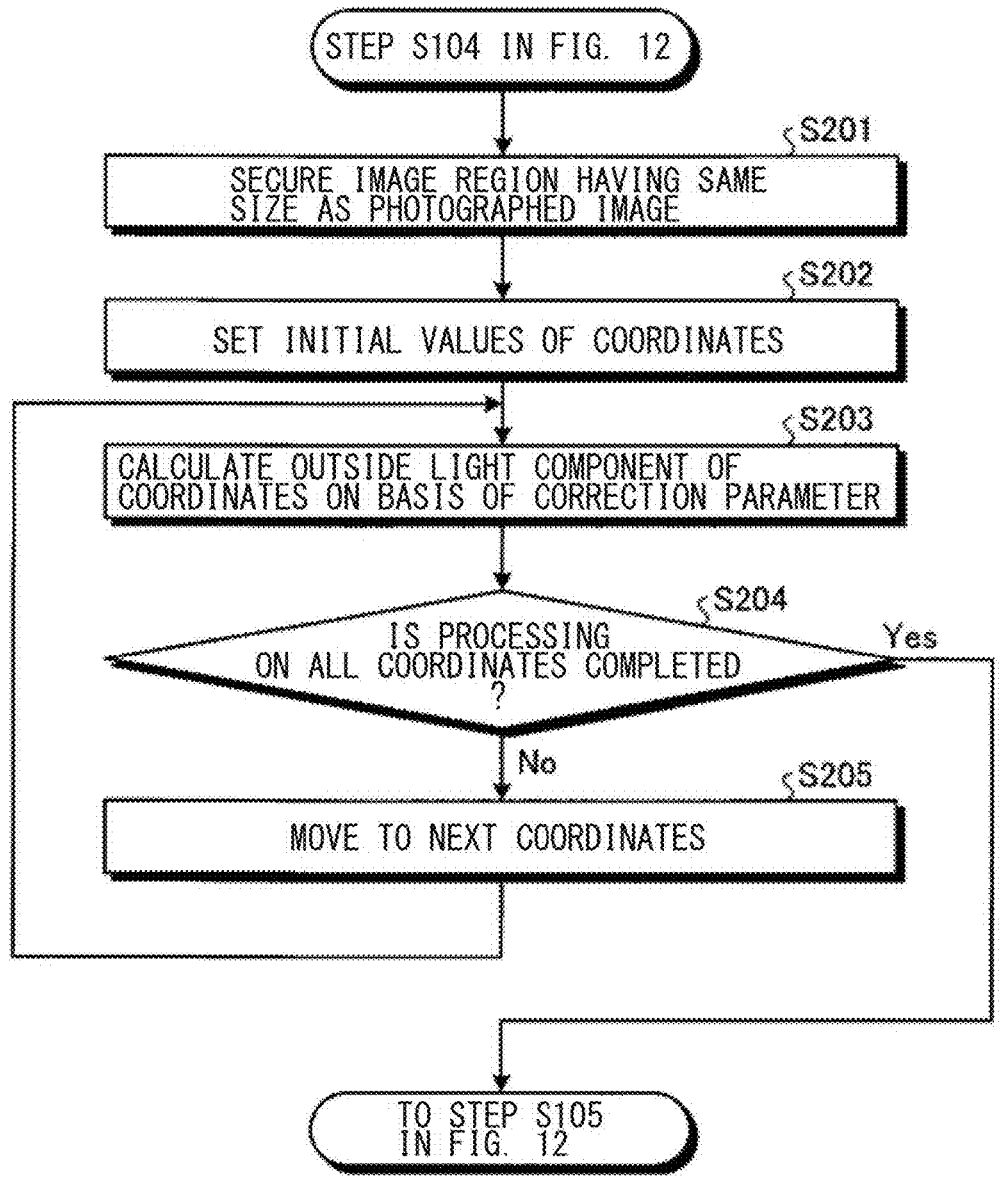

[ FIG. 14 ]
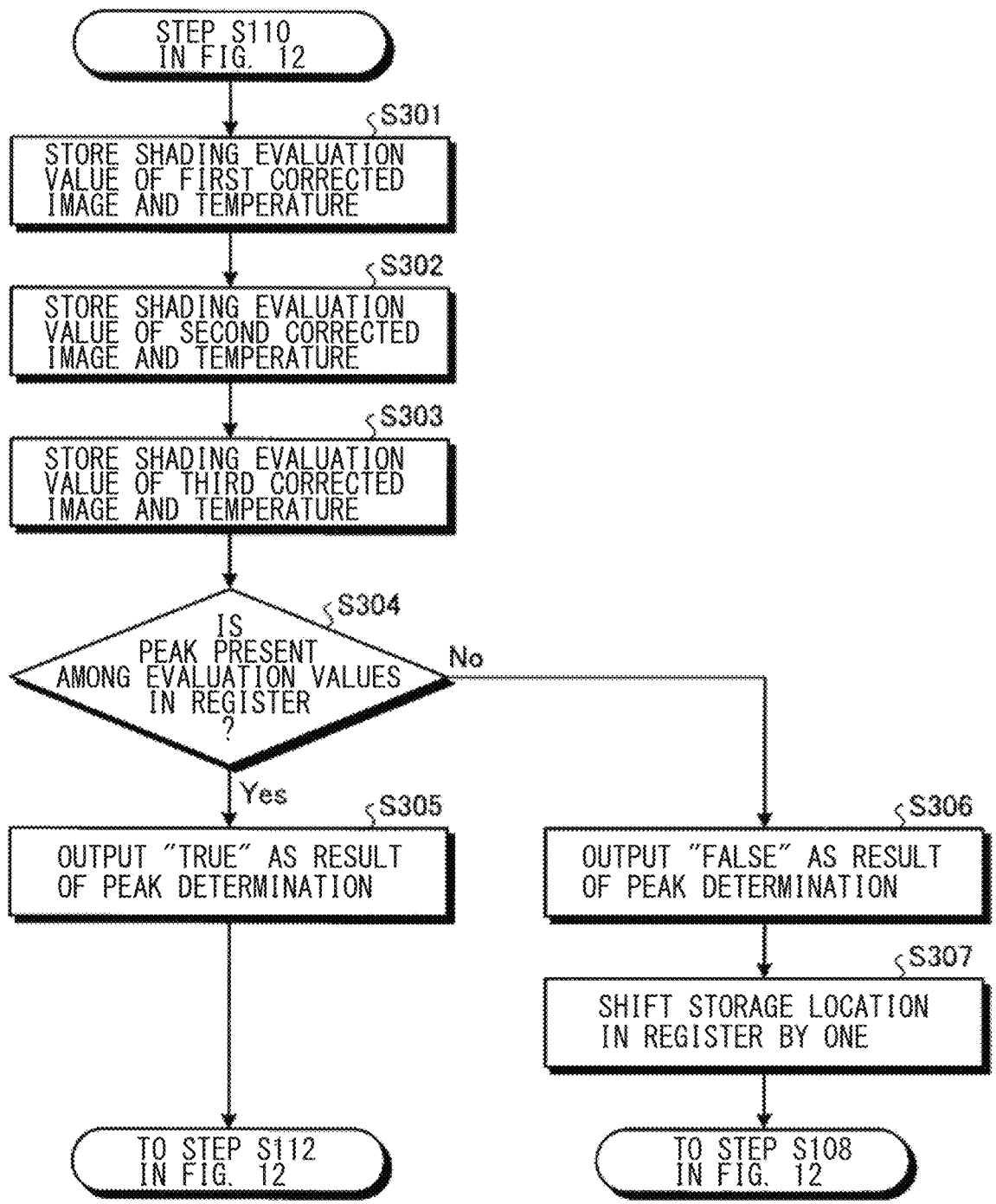

[ FIG. 15 ]
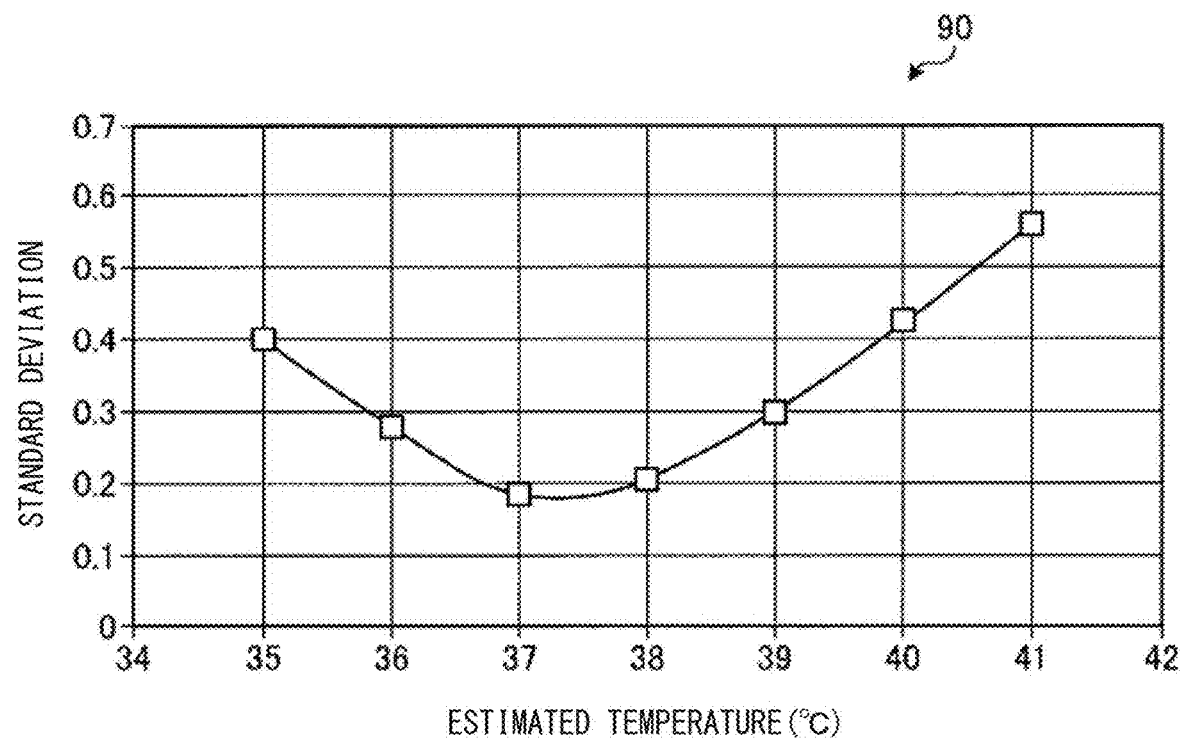

[ FIG. 16 ]
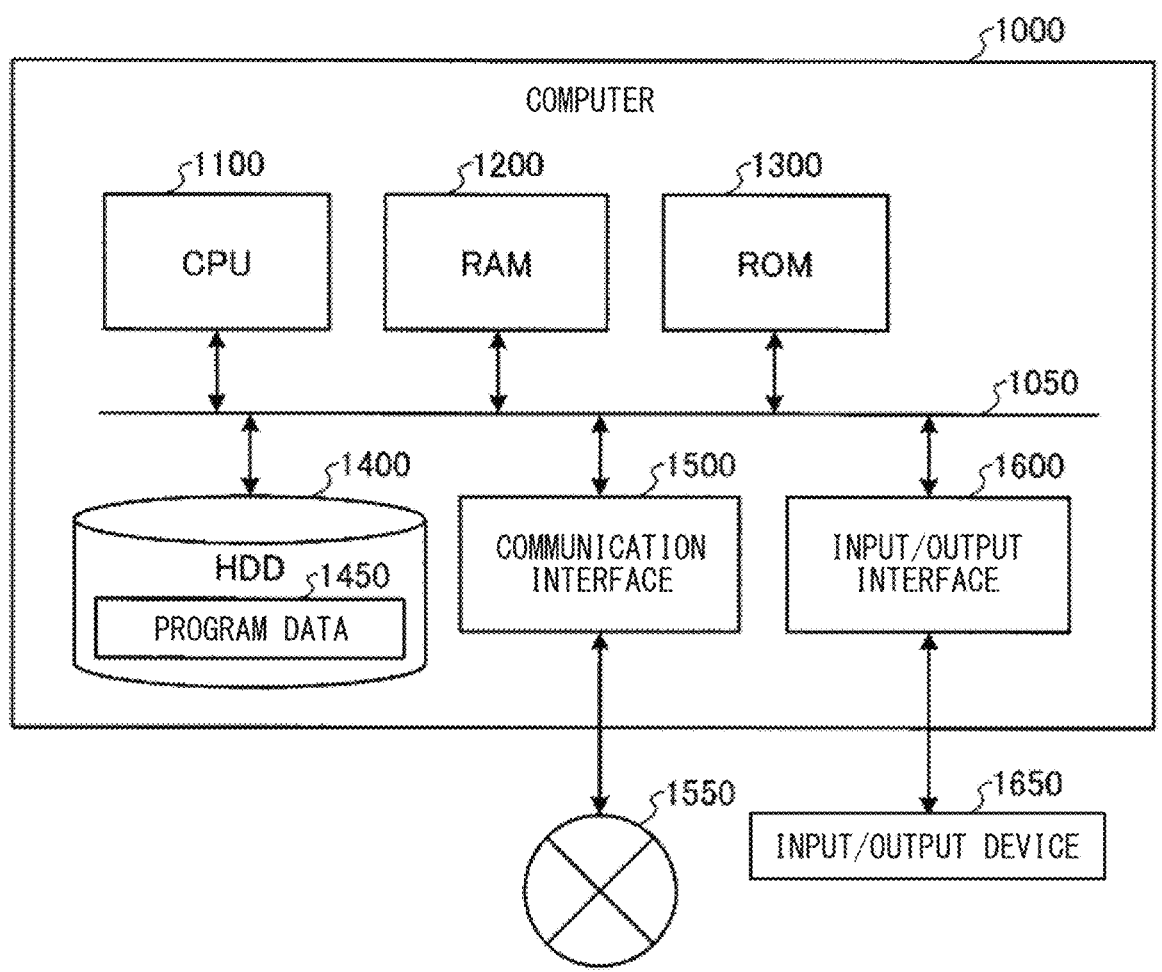

TEMPERATURE ESTIMATION DEVICE, TEMPERATURE ESTIMATING METHOD, AND TEMPERATURE ESTIMATING PROGRAM

CROSS REFERENCE TO PRIOR APPLICATION

This application is a National Stage Patent Application of PCT International Patent Application No. PCT/JP2019/040396 (filed on Oct. 15, 2019) under 35 U.S.C. § 371, which claims priority to Japanese Patent Application No. 2018-208225 (filed on Nov. 5, 2018), which are all hereby incorporated by reference in their entirety.

TECHNICAL FIELD

The present disclosure relates to a temperature estimation device, a temperature estimating method, and a temperature estimating program. Specifically, the present disclosure relates to housing temperature estimation processing in a lensless (Lensless) system infrared camera.

BACKGROUND ART

A lensless camera including no lens, which allows for thin design as compared with existing lens cameras, is widely used. The lensless camera not only performs photographing by visible light, but also is achievable as a so-called infrared camera that performs photographing by non-visible light such as infrared light.

The infrared camera performs imaging by capturing infrared light radiated from a subject; therefore, temperature calibration is performed with respect to an imaging element (a sensor) before photographing with use of the infrared camera. For example, a technology has been proposed for performing temperature calibration with use of a polynomial approximation technique (for example, NPL 1). It is to be noted that as a technology related to the lensless camera, a technology has been disclosed for defining, as a matrix, which information about how incident light is projected onto a sensor through a mask in advance, and reproducing an actual scene from the matrix and an image projected onto the sensor (for example, NPL 2). In addition, a technology has been disclosed for applying a lensless camera technology to a far-infrared wavelength (for example, NPL 3).

CITATION LIST

Non-Patent Literature

NTL 1: Riou, Olivier, Stephane Berrebi, and Pierre Bremond, "Nonuniformity correction and thermal drift compensation of thermal infrared camera." Thermosense XXVI. Vol. 5405. International Society for Optics and Photonics, 2004.
NTL 2: Boominathan, Vivek, et al. "Lensless Imaging: A computational renaissance." IEEE Signal Processing Magazine 33.5 (2016): 23-35.
NTL 3: Erickson, Evan L., et al. "Miniature lensless computational infrared imager." Electronic Imaging 2016.12 (2016): 1-4.

SUMMARY OF THE INVENTION

Problems to be Solved by the Invention

A lensless camera is achievable as a so-called infrared camera as disclosed in the above-described related art. However, if appropriate temperature calibration is not executed as described above, in the infrared camera, an undesired phenomenon such as noise in an imaging result occurs. Further, the lensless camera has a characteristic that an influence of radiated light from a housing is large, as compared with a lens camera. It is therefore desirable to perform calibration for removing the influence of the radiated light from the housing at the time of photographing, in addition to temperature calibration in advance (for example, at the time of factory shipment). It is possible to measure the radiated light from the housing on the basis of a housing temperature; therefore, once the housing temperature is known, it is possible to perform the calibration for removing the influence of the radiated light. However, to measure the housing temperature, a dedicated measurement device is provided in the lensless camera. As a result, cost of the lensless camera may be increased, and the configuration of the lensless camera may be complicated.

The present disclosure therefore proposes a temperature estimation device, a temperature estimating method, and a temperature estimating program that make it possible to accurately estimate a housing temperature while simplifying a configuration of a lensless camera.

Means for Solving the Problems

To solve the above-described issues, a temperature estimation device according to an embodiment of the present disclosure includes: an acquiring section that acquires a photographed image photographed by a photographing section including an infrared light sensor and a housing: a generating section that corrects the photographed image with use of a correction parameter and a temporarily set temperature of the housing to generate a corrected image of the photographed image, the correction parameter that is calculated by prior temperature calibration with respect to the photographing section; and an estimating section that estimates a temperature of the housing on the basis of non-uniformity of luminance values of pixels included in the corrected image.

BRIEF DESCRIPTION OF DRAWINGS

FIG. 1 is a schematic explanatory diagram (1) of incident light onto a temperature estimation device according to an embodiment of the present disclosure.
FIG. 2 is a schematic explanatory diagram (2) of incident light onto the temperature estimation device according to the embodiment of the present disclosure.
FIG. 3 is a schematic explanatory diagram (3) of incident light onto the temperature estimation device according to the embodiment of the present disclosure.
FIG. 4 is a schematic explanatory diagram (4) of incident light onto the temperature estimation device according to the embodiment of the present disclosure.
FIG. 5 is a diagram illustrating an example of a corrected image in a case where no error in an estimated temperature occurs.
FIG. 6 is a diagram illustrating an example of a corrected image in a case where an error in an estimated temperature occurs.
FIG. 7 is an explanatory diagram of shading (shading) generated in a corrected image.
FIG. 8 is a graph illustrating a relationship between an estimated error in radiated light from a housing and shading.

FIG. 9 is a graph illustrating relations between a standard deviation and an error in an estimated temperature of the housing.

FIG. 10 is a diagram illustrating a configuration example of a calibration system according to the embodiment.

FIG. 11 is a diagram illustrating a configuration example of the temperature estimation device according to the embodiment.

FIG. 12 is a flowchart illustrating a flow of temperature estimation processing according to the embodiment of the present disclosure.

FIG. 13 is a flowchart illustrating a flow of generation processing according to the embodiment of the present disclosure.

FIG. 14 is a flowchart illustrating a flow of peak determination processing according to the embodiment of the present disclosure.

FIG. 15 is a graph illustrating relations between a standard deviation and an error in an estimated temperature of the housing in the peak determination processing.

FIG. 16 is a hardware configuration diagram illustrating an example of a computer that implements a function of the temperature estimation device.

MODES FOR CARRYING OUT THE INVENTION

Hereinafter, embodiments of the present disclosure are described in detail with reference to the drawings. It is to be noted that, in the following embodiments and the following modification examples, the same components are indicated by the same reference signs and thus redundant description thereof is omitted.

The present disclosure is described in the following order.
1. Embodiment
   1-1. Issues to be Solved by Temperature Estimation Device According to Embodiment
   1-2. Overview of Temperature Estimation Processing According to Embodiment
   1-3. Configuration of Calibration System for Performing Prior Calibration According to Embodiment
   1-4. Configuration of Temperature Estimation Device According to Embodiment
   1-5. Procedure of Information Processing According to Embodiment
   1-6. Modification Examples of Embodiment
2. Other Embodiments
3. Hardware Configuration Example 1. Embodiment

[1-1. Issues to be Solved by Temperature Estimation Device According to Embodiment]

In general, a lensless camera acquires a photographed image by disposing a mask having a transmissive region and a non-transmissive region that are arranged in a two-dimensional pattern in front of an image sensor and reconstructing radiated light from an observation value of the sensor. For example, in the lensless camera, information such as how the radiated light is projected onto the sensor through the mask is defined as a matrix in advance, and an actual scene is reproduced from the matrix and an image projected onto the sensor. Image reconstruction in the lensless camera is a known technology (for example, see NPL 2 described above), detailed description thereof is omitted.

Here, a temperature estimation device 100 according to an embodiment is a lensless camera for infrared light. In this case, as an imaging element (sensor), for example, a two-dimensional sensor array (referred to as an "FPA (Focal Plane Array)" or the like) for an far-infrared camera is adopted. The two-dimensional sensor array for an far-infrared camera is broadly divided into a cooled type sensor array in which cooling is performed to about a temperature as low as liquid nitrogen for use and an uncooled type (or a thermal type) sensor array in which cooling is not performed. The cooled type sensor array has high performance and its own temperature is not changed; therefore, it is not necessary to perform correction in accordance with an environmental temperature. However, there is a disadvantage that the cooled type sensor array is large in size and extremely expensive.

Accordingly, the uncooled type sensor array is frequently used for general users. Examples of the uncooled type sensor array include forms such as a microbolometer (Micro bolometer) form, a thermopile form, and a pyroelectric form. Among them, the microbolometer form, which is relatively easy to achieve high resolution and has high sensitivity, is frequently used for high image quality applications. In the embodiment, such a microbolometer form sensor array is provided in a photographing section 110 of the temperature estimation device 100.

However, an output value of the microbolometer is changed in accordance with change in its own temperature; therefore, to perform absolute temperature measurement, it is necessary to frequently perform temperature calibration (hereinafter simply referred to as "calibration") during use.

In addition, in a case where calibration is executed on a lensless system infrared camera, the calibration is performed in a state in which the mask is provided, which causes an issue different from that in a lens type far-infrared camera. That is, the mask is provided, which causes not only outside light but also radiated infrared light from a masked portion and radiated infrared light from a housing to enter the sensor. Accordingly, incident light onto the sensor is a weighted sum of all the radiated light. For this reason, to extract an outside light component in the sensor, it is necessary to remove radiated light from the housing or the like from incident light.

An infrared camera provided with a lens is similar in that radiated light from a housing enters a sensor array. However, in a case of a lens camera, radiated light from a target is condensed to one pixel of the sensor array, which causes radiated light from the housing to be applied to the entire sensor array substantially uniformly even though a difference in incident light between pixels is large. In addition, even if there are some variations in the radiated light from the housing, contrast of incident light from the target is high; therefore, even if the radiated light is treated as an offset component, the radiated light from the housing is not a major issue.

In contrast, in a case of a lensless form, light from a target is applied to the entire sensor array, which causes the influence of the radiated light from the housing to be large, as compared with a lens form. This respect is described with reference to FIGS. 1 to 3. FIG. 1 is a schematic explanatory diagram (1) of incident light onto the temperature estimation device 100 according to the embodiment. It is to be noted that in the embodiment, infrared light is assumed, and light such as incident light, outside light, and radiated light that are to be described below may be therefore read as heat (temperature).

FIG. 1 illustrates the temperature estimation device 100 according to the embodiment and the photographing section 110 that is a component portion built in the temperature estimation device 100 and photographs a subject with no lens. The temperature estimation device 100 is a so-called lensless camera, and is a device that photographs a subject, and stores the photographed subject as an image. Specifically, the temperature estimation device 100 is a lensless form infrared camera that receives infrared light such as far-infrared light to perform photographing. It is to be noted that the embodiment indicates a configuration in which the photographing section 110 is built in the temperature estimation device 100; however, the temperature estimation device 100 and the photographing section 110 may be configured as different devices.

As illustrated in FIG. 1, the photographing section 110 includes a housing 111, a sensor array 112, and a mask 115. It is to be noted that FIGS. 1 to 3 represent the sensor array 112 one-dimensionally (only in a vertical direction) for ease of description; however, the sensor array 112 actually has a shape in which respective sensors are arranged two-dimensionally (in the vertical direction and a horizontal direction).

The mask 115 is an object disposed in front of the sensor array 112, and includes two kinds of patterns, that is, an open section 115a and a closed section 115b. Light passes through the open section 115a. In contrast, light does not pass through the closed section 115b.

FIG. 1 illustrates a situation in which light (infrared light) applied from a point 10 enters the sensor array 112 of the photographing section 110. As illustrated in FIG. 1, the light from the point 10 passes through the open section 115a of the mask 115, and enters a sensor 112a or the like, which is one example of a sensor included in the sensor array 112. In contrast, the light from the point 10 does not directly enter a sensor 112b or the like that is in the shadow of the closed section 115b of the mask 115. Thus, in the lensless form, a nearly equal amount of light enters respective sensors that are not blocked by the closed section 115b.

Next, FIG. 2 is described. FIG. 2 is a schematic explanatory diagram (2) of incident light onto the temperature estimation device 100 according to the embodiment of the present disclosure. FIG. 2 illustrates an example in which light is applied from a point 11 different from the point 10 to the photographing section 110.

Even in an example in FIG. 2, similarly to FIG. 1, of the light applied from the point 11, light having passed through the open section 115a enters the sensor 112a or the like. In contrast, the light from the point 11 does not directly enter the sensor 112b or the like that is in the shadow of the closed section 115b of the mask 115.

Photographing some spectacle (scene) by the photographing section 110 means simultaneously observing a plurality of photographing target points such as the point 10 illustrated in FIG. 1 and the point 11 illustrated in FIG. 2. This respect is described with use of FIG. 3. FIG. 3 is a schematic explanatory diagram (3) of incident light onto the temperature estimation device 100 according to the embodiment of the present disclosure. FIG. 3 illustrates a state in which light applied from the point 10 illustrated in FIG. 1 and light applied from the point 11 illustrated in FIG. 2 enter the photographing section 110.

As illustrated in FIG. 3, the value of incident light observed by each of sensors (such as the sensor 112a and the sensor 112b) of the sensor array 112 is a sum of incident light applied from the point 10 and incident light applied from the point 11. In an example in FIG. 3, as compared with the examples illustrated in FIGS. 1 and 2, amounts of incident light onto the respective sensors are different, which causes a value to be inputted to each of the sensors to be slightly changed. The reason for this is that the mask 115 is disposed in front of the sensor array 112, which changes incident light onto each of the sensors depending on a position of the photographing target. The temperature estimation device 100 that is a lensless camera is able to reconstruct, as an image, a scene that is a photographing target with use of such a difference as a clue.

As illustrated in FIGS. 1 to 3, in the lensless form, light from a target (such as the point 10 and the point 11) is applied to the entirety of each of the sensors of the sensor array 112, which reduces a difference between observation values in the respective sensors, as compared with a lens form camera. This means that an image having low contrast of luminance values is observed in the lensless form. In other words, in the lensless form, an influence of light other than outside light, for example, an influence of radiated light from the housing 111 is large, as compared with that in the lens camera.

Accordingly, in the lensless form camera, calibration for removing the influence of the radiated light from the housing 111 is desired at the time of photographing. It is possible to measure the radiated light from the housing 111 on the basis of a housing temperature: therefore, if the housing temperature is known, it is possible to perform the calibration for removing the influence of the radiated light. However, to measure the housing temperature, a dedicated measurement device is provided in the lensless camera. That is, the lensless form infrared camera has issues that for execution of accurate calibration, cost of the lensless camera increases and the configuration of the lensless camera is complicated. In other words, the lensless form infrared camera has issues for accurately estimating a housing temperature while simplifying its configuration.

[1-2. Overview of Temperature Estimation Processing According to Embodiment]

The temperature estimation device 100 according to the embodiment solves the issues described above by processing to be described below. Temperature estimation processing to be executed by the temperature estimation device 100 is described with use of FIG. 4 with reference to an incident light model (a schematic view) for a lensless form sensor.

FIG. 4 is a schematic explanatory diagram (4) of incident light onto the temperature estimation device according to the embodiment of the present disclosure. It is to be noted that similarly to FIGS. 1 to 3, FIG. 4 one-dimensionally represents the sensor array 112 for ease of description; however, the sensor array 112 actually has a shape in which respective sensors are arranged two-dimensionally. In FIG. 4, description is given of an example in a case where light enters a sensor 113, whose sensor location is at coordinates (x, y), of the sensor array 112.

As described in FIGS. 1 to 3, a true value $I_O(x, y)$ of observation of incident light onto the sensor 113 on the sensor array 112 is a weighted sum of an outside light component tb(x, y) entering the sensor 113 and housing radiated light tw(x, y). It is to be noted that the housing radiated light may be read as a housing temperature as described above.

The outside light component tb(x, y) indicates a light component that reaches the sensor 113 through the mask 115. An angle 21, an angle 22, and an angle 23 illustrated in FIG. 4 indicate incident angles of light that reaches the sensor 113 through the open section 115a of the mask 115. In addition, an angle 24 illustrated in FIG. 4 indicates a maximum range of an incident angle of light that reaches the sensor 113 through the mask 115. In addition, an angle 25 and an angle 26 illustrated in FIG. 4 indicate angles of light blocked by the closed section 115b of the mask 115.

In addition, the housing radiated light tw(x, y) indicates a light component that reaches the sensor 113 of light radiated from the housing 111. An angle 31 and an angle 32 illustrated in FIG. 4 indicate incident angles of housing radiated light that reaches the sensor 113 from the housing 111.

The true value $I_O(x, y)$ of incident light onto the sensor 113 is represented by the following equation (1), for example, by defining respective values as described above.

[Math. 1]

$$I_O(x,y) = \{C_0(x,y)t_b(x,y) + C_i(x,y)t_w\}b(x,y) + a(x,y) \quad (1)$$

In the equation (1), $C_n(x, y)$ (where n is any integer) is a constant calculated from geometric information of the sensor array 112 and the mask 115, and is known. In addition, in the equation (1), a(x, y) and b(x, y) each indicate a calibration correction coefficient vector in the sensor 113. As described in detail later, the calibration correction coefficient vector is a correction parameter for each sensor obtained by calibration performed before photographing. The calibration correction coefficient vector is calculated by prior calibration, and is therefore a known value at the time of photographing. It is to be noted that in the following description, the calibration correction coefficient vector is sometimes simply referred to as a "correction parameter".

To acquire an accurate image, it is sufficient if the temperature estimation device 100 accurately calculates the outside light component tb(x, y) (in other words, irradiated light in a scene to be photographed) that is a component other than housing radiated light tw. The above-described equation (1) may be modified into the following equation (2).

[Math. 2]

$$t_b(x, y) = \frac{1}{C_0(x, y)}\left(\frac{I_o(x, y) - a(x, y)}{b(x, y)} - C_1(x, y)t_w\right) \quad (2)$$

In the above-described equation (2), the correction parameters a(x, y) and b(x, y) are calculated in advance as described above, and are therefore known. In addition, the true value $I_O(x, y)$ is also an observable value, and is known. That is, assuming that the housing radiated light tw(x, y) is correctly calculated, the temperature estimation device 100 is able to calculate the outside light component tb(x, y).

As described above, the housing radiated light tw(x, y) depends on the temperature of the housing 111. That is, to correctly calculate the housing radiated light tw(x, y), it is necessary for the temperature estimation device 100 to estimate the temperature of the housing 111. Here, a true value of the housing radiated light is defined as "tw'(x, y)", and estimated housing radiated light tw'(x, y) is represented by "tw'(x, y)=tw(x, y)+Δtw". Here, Δtw indicates an estimated error in the housing radiated light.

In a case where the estimated error in the housing radiated light is assumed as described above, it is possible to represent an observation value "Io'(x, y)" with an error of incident light by the following equation (3).

[Math. 3]

$$I_o'(x,y) = I_O(x,y) + C_1(x,y)b(x,y)\Delta t_w \quad (3)$$

As can be seen from Δtw(x, y) included in the second term on the right side of the above-described equation (3), the second term on the right side of the above-described equation (3) is a noise component in the observation value Io' with an error. That is, the second term is a noise component with respect to the true value Io(x, y) of incident light observation, which does not allow the temperature estimation device 100 to accurately calculate the outside light component tb(x, y) with use of the equation (2).

Here, of coefficients in the second term on the right side of the above-described equation (3). $C_1(x, y)$ is defined as the following equation (4).

[Math. 4]

$$C_1(x, y) = \frac{1}{\pi^2}(\xi_w(x, y) + \xi_m(x, y)) \quad (4)$$

$\xi_w(x, y)$ in the above-described equation (4) indicates an angle of radiated light from the housing 111 with respect to the sensor 113. A plurality of $\xi_w(x, y)$ is present; therefore, in a case where each of a plurality of angles is represented by $\xi_{wn}(x, y)$ (where n is any integer), it is possible to represent, for example, the angle 31 in FIG. 4 by $\xi_{w1}(x, y)$. Similarly, it is possible to represent the angle 32 in FIG. 4 by $\xi_{w2}(x, y)$. That is, $\xi_w(x, y)$ in the above-described equation (4) is represented by $\xi_{w1}(x, y) + \xi_{w2}(x, y)$. It is to be noted that FIG. 4 represents the sensor array 112 one-dimensionally, but the sensor array 112 is actually two-dimensional; therefore, $\xi_w(x, y)$ indicates a solid angle.

In addition, $\xi_w(x, y)$ in the above-described equation (4) indicates an angle within a range in which incident light from outside is blocked by the closed section 115b. $\xi_m(x, y)$ may have a plurality of values different depending on the shape of the mask 115. For example, in a case where each of the plurality of $\xi_m(x, y)$ is represented by $\xi_{mn}(x, y)$ (where n is any integer), the angle 25 in FIG. 4 corresponds to $\xi_{m1}(x, y)$. Similarly, the angle 26 in FIG. 4 corresponds to $\xi_{m2}(x, y)$. $\xi_m(x, y)$ indicates a solid angle similarly to $\xi_w(x, y)$.

Furthermore, an angle of incident light from outside with respect to the sensor 113 is defined as $\xi_b(x, y)$, it is possible to represent the above-described equation (4) by the following equation (5).

[Math. 5]

$$\xi_b(x,y) + \xi_m(x,y) + \xi_w(x,y) = \pi^2 \quad (5)$$

$\xi_b(x, y)$ in the above-described equation (5) indicates an angle of incident light from outside with respect to the sensor 113. $\xi_b(x, y)$ may have a plurality of values different depending on the shape of the mask 115. For example, in a case where each of the plurality of $\xi_b(x, y)$ is represented by $\xi_{bn}(x, y)$ (where n is any integer), the angle 21 in FIG. 4 corresponds to $\xi_{b1}(x, y)$. Similarly, the angle 22 in FIG. 4 corresponds to $\xi_{b2}(x, y)$, and the angle 23 corresponds to $\xi_{b3}(x, y)$. It is to be noted that $\xi_b(x, y)$ indicates a solid angle similarly to $\xi_w(x, y)$ and $\xi_m(x, y)$.

Here, under conditions that the solid angle $\xi_w(x, y)$ occupied by the housing 111 is substantially the same as a solid angle (the angle 24 in FIG. 4) indicated by the mask 115 in which the open section 115a and the closed section 115b are combined, and areas of the open section 115a and the closed section 115b are substantially the same as each other, $\xi_w(x, y) \geq \xi_m(x, y) + \xi_b(x, y)$ is established. That is, $\xi_w(x, y) \geq 2\xi_m(x, y)$ is established, from which it can be seen that an influence of $\xi_w(x, y)$ exerted on $C_1(x, y)$ in the above-described equation (4) is larger than an influence of $\xi_m(x, y)$.

Here, it is possible to represent $\xi_w(x, y)$ by the following equation (6).

[Math. 6]

$$\xi_w(x, y) = \pi^2 - \left\{\tan^{-1}\left(\frac{L-2x}{2l}\right) + \tan^{-1}\left(\frac{L+2x}{2l}\right)\right\}\left\{\tan^{-1}\left(\frac{L-2y}{2l}\right) + \tan^{-1}\left(\frac{L+2y}{2l}\right)\right\} \quad (6)$$

As illustrated in FIG. 4, "L" in the above-described equation (6) indicates a length of one side of the mask 115. In addition, as illustrated in FIG. 4, "l" indicates a length between the mask 115 and the sensor array 112. It is possible to represent a term in the first parentheses of the second term on the right side of the above-described equation (6) by the following equation (7) by generalizing the term in the first parentheses.

[Math. 7]

$$y = \tan^{-1}(C-x) + \tan^{-1}(C+x) \quad (7)$$

As can be seen from the above-described equation (7), the above-described equation (7) is a function where y takes a maximum value when x=0.

Accordingly, the above-described equation (6) takes a minimum value when x=0 and y=0 in the above-described equation (7). In addition, the above-described equation (4) also takes a minimum value when x=0 and y=0 in the above-described equation (7).

Accordingly, in a case where the true value $I_O(x, y)$ in the first term of the above-described equation (3) is constant in an image, the observation value Io'(x, y) with an error of incident light varies in the image in accordance with the value of Δtw in the second term of the equation (3). That is, the observation value Io'(x, y) forms a shading image (an image in which unevenness in luminance values occurs in the image) in which x=0 and y=0 are extreme values.

In view of the above, in a case where radiated light from the housing 111 is correctly estimated, in other words, in a case of Δtw=0, no shading is generated in an image. That is, to minimize an error in an estimated temperature of the housing 111, it is sufficient if a housing temperature that minimizes shading is estimated.

Here, FIG. 5 illustrates a corrected image in a case where an input image of a black body furnace observed (photographed) by the temperature estimation device 100 is corrected by Δtw=0. FIG. 5 is a diagram illustrating an example of a corrected image 41 in a case where no error in the estimated temperature occurs. It is to be noted that the black body furnace is a jig that is able to set a temperature in a plane at high accuracy and is configured to have an extremely small temperature difference in an in-plane distribution thereof, and is used for calibration of an infrared camera or the like, for example.

The corrected image 41 illustrated in FIG. 5 is an image after correction in a case where a photographed image of the black body furnace photographed by the temperature estimation device 100 is corrected by Δtw=0. Specifically, the corrected image 41 represents, as an image, a calculation result obtained by substituting Δtw=0 into the above-described equation (3) and calculating the observation value Io'(x, y) for each of pixels included in the photographed image.

Next, FIG. 6 illustrates a corrected image in a case where an input image of the black body furnace observed by the temperature estimation device 100 is corrected by a numeric value other than Δtw=0. FIG. 6 is a diagram illustrating an example of a corrected image 42 in a case where an error in the estimated temperature occurs.

The corrected image 42 illustrated in FIG. 6 is an example of an image after correction in a case where the photographed image of the black body furnace photographed by the temperature estimation device 100 is corrected by Δtw=3. As illustrated in FIG. 6, the corrected image 42 is an image in which unevenness in the luminance values occurs from a center to an end of the image. The corrected image 42 indicates that as compared with a center (that is, coordinates (0, 0)) of the sensor array 112, a sensor located at an end of the sensor array 112 is more susceptible to an influence of the housing 111. As illustrated in FIG. 6, shading is apparently generated in the corrected image 42, as compared with the corrected image 41 (in a case of Δtw=0) illustrated in FIG. 5.

Generation of shading is further described with use of FIGS. 7 and 8. FIG. 7 is an explanatory diagram of shading generated in a corrected image.

A line 45 illustrated in FIG. 7 indicates coordinates in a case where x is variable at y=0 in the corrected image 41 illustrated in FIG. 5. In addition, a line 46 illustrated in FIG. 7 indicates coordinates in a case where x is variable at y=0 in the corrected image 42 illustrated in FIG. 6. It is possible to observe states of shading generated in the corrected image 41 and the corrected image 42 by referring to housing estimated temperatures in pixels on the line 45 and the line 46.

FIG. 8 is a graph illustrating a relationship between the estimated temperature of the housing 111 and shading generated in a corrected image. Specifically, FIG. 8 illustrates a graph in which the observation value Io'(x, y) with an error is plotted on one line on the corrected image, such as the line 45 and the line 46 illustrated in FIG. 7. It is to be noted that in FIG. 8, a case where the temperature estimation device 100 observes a black body furnace set at 50° C. is used as a reference.

A graph 50 in FIG. 8 illustrates relations of how the housing estimated temperature transitions in each of cases where an error is Δtw=0 (corresponding to a state of the corrected image 41 in FIG. 7), Δtw=−1, Δtw=−2, Δtw=−3, Δtw=1, Δtw=2, and Δtw=3 (Δtw=3 corresponds to a state of the corrected image 42 in FIG. 7).

As can be seen from the graph 50, the larger the absolute value of Δtw is, the more strongly convex or concave shading is generated. Meanwhile, the graph 50 indicates that the smaller the absolute value of Δtw is, the less likely shading is to be generated. In other words, this indicates that in a case where the temperature estimation device 100 observes the corrected image, a value of housing radiated light that minimizes shading is a true value.

A technique of determining whether or not shading in the corrected image is minimum is described below. As an example of such a determining technique, the temperature estimation device 100 adopts a technique of minimizing a standard deviation of a luminance value in an image.

Here, assuming that an accurate temperature of the housing 111 is $t_{wt}$, the housing temperature $t_{wt}$ is defined with use of the following equation (8), for example.

[Math. 8]

$$t_{wt} = \underset{t_w}{\mathrm{argmin}} \sigma_{t_w} \qquad (8)$$

$\sigma_{t_w}$ in the above-described equation (8) indicates a standard deviation of incident light onto the entirety of sensors in a case where the housing temperature is tw. In a case where the standard deviation $\sigma_{t_w}$ of the incident light is minimum, shading in the corrected image is minimum. This respect is described below.

First, in a case where a black body furnace is observed, a standard deviation in an image of the true value $I_O$ in the above-described equation (3) is nearly equal to 0. Accordingly, an amount of generated shading depends on the second term of the above-described equation (3).

Here, a general equation indicating an average is represented by the following equation (9).

[Math. 9]

$$\bar{y} = \frac{1}{N}\sum_{i=0}^{N-1} y_i \qquad (9)$$

Similarly, a general equation indicating a standard deviation a is represented by the following equation (10).

[Math. 10]

$$\sigma^2 = \frac{1}{N}\sum_{i=0}^{N-1}(y_i - \bar{y})^2 \qquad (10)$$

A standard deviation for noise of all pixels in the image is represented by the following equation (11) on the basis of the above-described equations (9) and (1).

[Math. 11]

$$\bar{y} = \frac{1}{MN}\sum_{y=0}^{N-1}\sum_{x=0}^{M-1}(C_1(x,y)b(x,y)\Delta t_w) \qquad (11)$$
$$= \Delta t_w \sum_{y=0}^{N-1}\sum_{x=0}^{M-1}(C_1(x,y)b(x,y))$$

Next, the above-described equation (11) is modified to obtain the following equation (12).

[Math. 12]

$$\sigma^2 = \frac{1}{MN}\sum_{y=0}^{N=0}\sum_{x=0}^{M=0}(C_1(x,y)b(x,y)\Delta t_w - \bar{y})^2 \qquad (12)$$
$$= \Delta t_w^2 \sum_{y=0}^{N=0}\sum_{x=0}^{M=0}\left(C_1(x,y)b(x,y) - \sum_{y=0}^{N=0}\sum_{x=0}^{M=0}(C_1(j,i)b(j,i))\right)^2$$

Furthermore, the above-described equation (12) is modified, which makes it possible to represent the standard deviation σ by the following equation (13).

[Math. 13]

$$\sigma = \Delta t_w \sqrt{\sum_{y=0}^{N=0}\sum_{x=0}^{M=0}(C_1(x,y)b(x,y) - \sum_{y=0}^{N=0}\sum_{x=0}^{M=0}(C_1(j,i)b(j,i)))^2} \qquad (13)$$

Then, the following equation (13) is modified, which makes it possible to represent Δtw by the following equation (14).

[Math. 14]

$$\Delta t_w = \frac{\sigma}{\sqrt{\sum_{y=0}^{N=0}\sum_{x=0}^{M=0}(C_1(x,y)b(x,y) - \sum_{y=0}^{N=0}\sum_{x=0}^{M=0}(C_1(j,i)b(j,i)))^2}} \qquad (14)$$

As can be seen from the above-descried equation (14), the error Δtw is minimum when the standard deviation σ is minimum.

It is to be noted that the technique described above is one example, and the temperature estimation device 100 may adopt any of techniques that make it possible to determine whether or not shading is minimum. For example, the temperature estimation device 100 may adopt a technique of extracting only a shading component by applying a lowpass filter to an image. As one example, the temperature estimation device 100 may determine whether or not shading is minimum by a technique such as a technique of removing, by the lowpass filter, a high-frequency component that easily generates shading and performing comparison with the removed shading component.

Next, relations between the standard deviation and the error Δtw with use of FIG. 9. FIG. 9 is a graph illustrating relations between the standard deviation and an error in the estimated temperature of the housing.

As illustrated in a graph 60 in FIG. 9, in a case where the standard deviation has a minimum value, the error Δtw is also minimum. In addition, as illustrated in the graph 60, the larger the absolute value of the standard deviation is, the larger the absolute value of the error Δtw becomes. It is to be noted that a numeric value illustrated in the graph 60 in FIG. 9 is one example, and it is assumed that the standard deviation and the error Δtw have values different from those in FIG. 9 in accordance with a photographing environment or the like.

As described above, the temperature estimation device 100 is able to estimate a correct housing temperature of the housing 111 by estimating a temperature at which shading is minimum. Specifically, the temperature estimation device 100 determines an index value for representing non-uniformity of luminance values in a corrected image (hereinafter referred to as a "shading evaluation value"), and estimates a temperature in a case where the index value is minimum as a housing temperature.

According to the above-described technique, the temperature estimation device 100 is able to estimate the temperature of the housing 111 without providing a dedicated measurement device or the like for measuring the housing temperature. This makes it possible for the temperature estimation device 100 to accurately estimate the housing temperature while simplifying a configuration as a lens camera. In addition, the temperature estimation device 100 performs the above-described temperature estimation processing for each photographing without preparing a dedicated device or the like associated with calibration, which makes it possible to perform photographing with use of the housing temperature consistently and correctly estimated. This makes it possible for the temperature estimation device 100 to stably acquire an image that is less susceptible to the influence from the housing.

It is to be noted that the above describes that the temperature estimation device 100 is able to estimate the true value of the housing temperature in a state in which the black body furnace having a constant temperature is observed. However, the above-described technique is applicable not only to a special observation target such as a black body furnace but also to a case where a general scene (subject) is photographed. That is, as illustrated in FIG. 3, in a lensless camera such as the temperature estimation device 100, light from a plurality of targets enters one sensor; therefore, as compared with a lens camera in which light from a target is condensed to one sensor, a difference in the observation value between pixels is small. Accordingly, in the lensless camera, even in a case where the general scene is photographed, an influence of shading is large, as compared with variation between pixels. Accordingly, the technique of determining shading with use of the above-described standard deviation is also applicable to the case where the general scene is photographed.

Hereinafter, a specific configuration, including prior calibration, of the temperature estimation device 100 that executes the above-described temperature estimation processing is described with use of FIGS. 10 and 11.

[1-3. Configuration of Calibration System for Performing Prior Calibration According to Embodiment]

A calibration system 1 according to the embodiment is described with use of FIG. 10. FIG. 10 is a diagram illustrating a configuration example of the calibration system 1 according to the embodiment. Calibration by the calibration system 1 is executed in a manufacturing process of the temperature estimation device 100 that is a lensless camera, for example. A correction parameter specific to each temperature estimation device 100 is derived by calibration by the calibration system 1.

As illustrated in FIG. 10, the calibration system 1 includes a black body furnace 70, the temperature estimation device 100, a black body furnace control device 200, a system control device 300, a calibration device 400, and a housing temperature measurement device 500. In addition, the temperature estimation device 100 includes the photographing section 110, a correction parameter storing section 121, and a controller 130.

The black body furnace 70 is a jig that is able to set a temperature in a plane at high accuracy and is configured to have an extremely small temperature difference in an in-plane distribution thereof. The black body furnace control device 200 is a device that controls a temperature of the black body furnace 70.

The system control device 300 is a device that controls an operation of the calibration system 1. For example, the system control device 300 performs input and output of control information with each device through a network, a wired cable, or the like, and controls the operation of the calibration system 1.

The calibration device 400 is a device that calculates a calibration correction vector that is a correction parameter on the basis of acquired information. The housing temperature measurement device 500 is a device that measures the temperature of the housing of the photographing section 110 at a predetermined timing.

The operation of the calibration system 1 is described below. First, the system control device 300 sends any set temperature that has been set in advance to the black body furnace control device 200 (step S11).

The black body furnace control device 200 controls the temperature of the black body furnace 70 in accordance with the set temperature acquired from the system control device 300 (step S12). In a case where the temperature of the black body furnace 70 reaches the set temperature, the black body furnace control device 200 sends, to the system control device 300, information that the temperature of the black body furnace 70 reaches the set temperature (step S13). In addition, the black body furnace control device 200 also sends similar information to the calibration device 400 (step S14).

In a case where the system control device 300 receives the temperature of the black body furnace 70 from the black body furnace control device 200, the system control device 300 sends, to the temperature estimation device 100, a capture signal that is information that controls the temperature estimation device 100 to photograph the black body furnace 70 (step S15).

The photographing section 110 of the temperature estimation device 100 that has received the capture signal photographs the black body furnace 70 in accordance with control by the captured signal, and sends, to the controller 130, a photographed image acquired by photographing (step S16).

At this time, the housing temperature measurement device 500 measures the temperature of the housing at the time of photographing the black body furnace 70, and sends the measured temperature to the system control device 300 (step S17). The system control device 300 sends, to the calibration device 400, the temperature of the housing received from the housing temperature measurement device 500 (step S18).

In addition, the controller 130 of the temperature estimation device 100 sends the photographed image acquired by photographing the black body furnace 70 to the calibration device 400 (step S19). That is, the calibration device 400 acquires the photographed image and the temperature of the housing at the time of photographing the photographed image in association with each other.

Thereafter, the system control device 300 sends a second temperature different from the set temperature sent in the step S11 to the black body furnace control device 200. Then, the calibration system 1 repeats processing of the steps S12 to S19. Thus, the calibration device 400 acquires a photographed image in a state in which the black body furnace 70 is set to the second temperature.

The calibration device 400 performs calibration on the basis of two photographed images at different temperatures and two different values of the housing temperature, and calculates a calibration correction coefficient vector.

The calibration correction coefficient vector is for correcting again and an offset in each of sensors included in the sensor array 112. That is, the sensor array 112 has a gain and an offset different for each sensor (pixel), which cause noise for each sensor (referred to as "FPN (Fix Patterned Noise)" or the like). A correction parameter for removing this noise is the calibration correction coefficient vector.

Calculation of the correction parameter is briefly described below. An observation value in the sensor array 112 is defined as DL (Digital thermosignal), and a value when a target at a temperature $T_i^0$ ($1 \leq i \leq n$) is observed by an index j ($1 \leq j \leq N$)th sensor is represented by $DL_{ij}$. Then, at this time, an average of DLs is represented by the following equation (15).

[Math. 15]

$$<DL_i> = \frac{\sum_{j=1 \ldots N} DL_{ij}(T_i^0)}{N} \tag{15}$$

A difference from the average value of respective sensors at the temperature $T_i^0$ is represented by the following equation (16) on the basis of the above-described equation (15).

[Math. 16]

$$\Delta DL_{ij} = DL_{ij} - <DL_i> \tag{16}$$

Further, the above-described equation (16) is approximated using a polynomial, which makes it possible to represent the equation (16) by the following equation (17).

[Math. 17]

$$\Delta DL_{ij}^{lq} = a_j + b_j <DL_i> + c_j <DL_i>^2 + \ldots \tag{17}$$

For example, in a case where terms up to the first order of a polynomial approximate equation of the above-described equation (17) are obtained, a correction parameter is calculated as a calibration correction coefficient vector including a gain and an offset for each sensor as illustrated in the following equation (18).

[Math. 18]

$$DL_{ij}^c = \frac{DL_{ij} - a_j}{1 + b_j} \tag{18}$$

"$a_j$" and "$b_j$" in the above-described equation (18) are correction parameters that are to be calculated by the calibration device 400. Here, of the above-described equation (18), $a_j$" and "$b_j$" are two unknowns; therefore, the calibration device 400 is able to calculate the correction parameters by acquiring images of a target (for example, the black body furnace 70) including a uniform temperature plane that are imaged at two different kinds of temperatures.

The calibration device 400 sends the correction parameters calculated as described above to the temperature estimation device 100 (step S20).

The controller 130 of the temperature estimation device 100 stores the acquired correction parameters in the correction parameter storing section 121 (step S21). As described above, the temperature estimation device 100 executes temperature estimation processing according to the present disclosure with use of the correction parameters at the time of actual photographing, which makes it possible to estimate the temperature of the housing accurately.

It is to be noted that a technique of calculating the correction parameters from two images corresponding to two kinds of temperatures has been described above: however, the calibration system 1 may adopt a technique of calculating correction parameters from three images corresponding to three kinds of temperatures.

[1-4. Configuration of Temperature Estimation Device According to Embodiment]

Next, a configuration example of the temperature estimation device 100 according to the embodiment is described with use of FIG. 11. FIG. 11 is a diagram illustrating the configuration example of the temperature estimation device 100 according to the embodiment.

As illustrated in FIG. 11, the temperature estimation device 100 includes the photographing section 110, a storing section 120, and the controller 130. It is to be noted that the temperature estimation device 100 may include a communication section for communicating with an external device, an input section (for example, a touch panel, a keyboard, and the like) that receives various kinds of operations from a user using the temperature estimation device 100, and a display section (for example, a liquid crystal display, and the like) for displaying various kinds of information, which are not illustrated in FIG. 11.

The photographing section 110 detects infrared light with the sensor array 112 that is one example of an infrared light sensor to photograph a subject 80.

As illustrated in FIG. 1 and the like, the photographing section 110 includes the mask 115 that includes each of the open section 115a through which light passes and the closed section 115b through which light does not pass on a light incident surface side of the housing 111. That is, the photographing section 110 photographs the subject 80 in a so-called lensless form, and sends image information acquired by photographing to the controller 130 or the like.

It is to be noted that in the embodiment, the photographing section 110 uses a microbolometer as an infrared light sensor. However, the infrared light sensor may be any form other than the microbolometer.

The storing section 120 is implemented by, for example, a semiconductor memory element such as a RAM (Random Access Memory) and a flush memory, or a storage device such as a hard disk and an optical disk. The storing section 120 includes the correction parameter storing section 121 and an initial temperature storing section 122.

The correction parameter storing section 121 stores a correction parameter calculated by the calibration device 400 as described in FIG. 10. The initial temperature storing section 122 stores an initial temperature in peak determination processing to be described later. It is to be noted that although not illustrated in FIG. 11, the storing section 120 may store an image photographed by the photographing section 110 or may store various kinds of setting information by the user.

The controller 130 is implemented by executing, by, for example, a CPU (Central Processing Unit), an MPU (Micro Processing Unit), or the like, a program (for example, a temperature estimating program according to the present disclosure) stored inside the temperature estimation device 100 in a RAM (Random Access memory) or the like as a work area. In addition, the controller 130 may be implemented, for example, by an integrated circuit such as an ASIC (Application Specific Integrated Circuit) and an FPGA (Field Programmable Gate Array).

As illustrated in FIG. 11, the controller 130 includes an acquiring section 131, a generating section 132, a calculating section 133, a peak determining section 134, an estimating section 135, and a correcting section 136, and implements or executes functions and actions of information processing to be described below. In addition, the controller 130 includes a temperature register 141 and an evaluation value pair register 142 that temporarily hold information used for the information processing. It is to be noted that an internal configuration of the controller 130 is not limited to a configuration illustrated in FIG. 11, and may be any of other configurations that perform the information processing to be described below.

The acquiring section 131 acquires various kinds of information. For example, the acquiring section 131 acquires a correction parameter calculated by the calibration device 400. The acquiring section 131 stores the acquired correction parameter in the correction parameter storing section 121.

In addition, the acquiring section 131 acquires initial temperature setting for performing generation processing and peak determination processing that are to be described later. For example, the acquiring section 131 acquires the initial temperature setting in accordance with an input by the user. It is to be noted that the initial temperature is an initial temperature used for the generation processing and the peak determination processing, and may have any value. The acquiring section 131 stores the acquired initial temperature in the initial temperature storing section 122.

In addition, the acquiring section 131 acquires a photographed image photographed by the photographing section 110 including an infrared light sensor (the sensor array 112 illustrated in FIG. 1 and the like) and the housing 111. The acquiring section 131 sends the acquired photographed image to the generating section 132.

The generating section 132 corrects the photographed image with use of a correction parameter calculated by prior calibration with respect to the photographing section 110 and a temporarily set temperature of the housing 111 to generate a corrected image that is an image after correction.

For example, the generating section 132 first temporarily sets an initial setting temperature as the temperature of the housing 111, and generates a corrected image with use of the initial setting temperature.

Specifically, the generating section 132 performs correction on each of pixels of the photographed image acquired by the acquiring section 131 with use of the correction parameter stored in the correction parameter storing section 121 and the initial temperature stored in the initial temperature storing section 122 to generate a corrected image. It is to be noted that in the following description, the corrected image generated by performing correction with use of the initial temperature may be referred to as a "first corrected image" to be distinguished from other corrected images. In addition, at this time, the generating section 132 stores, in the temperature register 141, the initial temperature stored in the initial temperature storing section 122.

Next, the generating section 132 increases the initial temperature stored in the temperature register 141 by a predetermined value (for example, 1° C. or the like). The generating section 132 then corrects the photographed image with use of the increased temperature and the correction parameter to generate a corrected image. In the following description, a corrected image generated next to a first image may be referred to as a "second corrected image" to be distinguished from other corrected images.

Further, the generating section 132 increases the last temperature stored in the temperature register 141 by a predetermined value, and corrects the photographed image with use of the increased temperature and the correction parameter to generate a corrected image. In the following description, a corrected image generated next to a second image may be referred to as a "third corrected image" to be distinguished from other corrected images. The generating section 132 then sends a plurality of generated corrected images to the calculating section 133.

As described above, the generating section 132 sets a plurality of temporary different temperatures, and generates a plurality of corrected images corresponding to the respective set temperatures.

Thereafter, the generating section 132 repeats, in accordance with control by the estimating section 135 to be described later, processing for increasing a temperature stored in the temperature register 141 by a predetermined value and correcting a photographed image with use of the increased temperature and the correction parameter to generate a corrected image, on an as needed basis. Specifically, the generating section 132 repeats generation of a corrected image until a peak of a shading evaluation value is determined by the peak determining section 134.

The calculating section 133 calculates an evaluation value in each of the corrected images generated by the generating section 132. For example, the calculating section 133 calculates an evaluation value indicating non-uniformity of luminance values in the corrected image. Specifically, the calculating section 133 calculates a shading evaluation value that is a value that evaluates an amount of shading in the corrected image.

As described above, the calculating section 133 calculates the shading evaluation value on the basis of a standard deviation in the corrected image. For example, the calculating section 133 may calculate each of standard deviations of a plurality of corrected images with use of the above-described equation (13), and may use the calculated value as a shading evaluation value.

The calculating section 133 then calculates respective shading evaluation values corresponding to three corrected image generated by the generating section 132, and stores the three calculated shading evaluation values in the evaluation value pair register 142. It is to be noted that in a case where a peak is not determined from the three sent shading evaluation values, the calculating section 133 repeats processing for calculating a shading evaluation value corresponding to a new corrected image in accordance with control by the estimating section 135.

The peak determining section 134 determines a peak from the shading evaluation values calculated by the calculating section 133. Here, the peak indicates a value where the shading evaluation value is lowest. The peak determining section 134 refers to three evaluation value pairs stored in the evaluation value pair register 142, and determines which temperature the shading evaluation value corresponding to is lowest. The peak determining section 134 then sends a result of determination to the estimating section 135.

The estimating section 135 estimates the temperature of the housing 111 of the photographing section 110 on the basis of non-uniformity of the luminance values of pixels included in the corrected image. For example, the estimating section 135 estimates the housing temperature on the basis of a value that evaluates non-uniformity of the luminance values. As one example, the estimating section 135 estimates the housing temperature on the basis of the shading evaluation value, which is calculated by the calculating section 133, in the corrected image.

Specifically, the estimating section 135 estimates, as the temperature of the housing 111, a temperature corresponding to the minimum shading evaluation value from temperatures (temperatures paired with shading evaluation values) used in a case where the shading evaluation values are determined.

For example, the estimating section 135 estimates the housing temperature on the basis of a standard deviation of the luminance values of the pixels included in the corrected image. As described above, the shading evaluation value is calculated on the basis of the standard deviation, which makes it possible for the estimating section 135 to estimate the temperature of the housing 111 from the standard deviation of the luminance values of the pixels included in the corrected image.

Specifically, the estimating section 135 estimates the housing temperature on the basis of a result of comparing standard deviations corresponding to a plurality of (three in the embodiment) respective corrected images.

More specifically, in a case where a standard deviation that is lowest (the peak) is present among the standard deviations corresponding to the plurality of respective corrected images, the estimating section 135 estimates a temperature corresponding to the standard deviation that is lowest as the housing temperature. It is to be noted that in a case where the estimating section 135 determines that the standard deviation that is the peak is not present among the standard deviations corresponding to the plurality of respective corrected images, the estimating section 135 controls the generating section 132 to further set a different temperature and newly generate a corrected image. In addition, the estimating section 135 controls the calculating section 133 to calculate a standard deviation corresponding to the newly generated corrected image. In this case, the peak determining section 134 newly performs peak determination processing including the newly calculated standard deviation, and determines whether or not the peak is present.

The correcting section 136 corrects the photographed image with use of the housing temperature estimated by the estimating section 135. That is, the correcting section 136 is able to correct the photographed image with use of the housing temperature estimated more accurately than initial setting, which makes it possible to acquire an appropriate image from which an error in the housing temperature is removed.

[1-5. Procedure of Information Processing According to Embodiment]

Next, a procedure of information processing according to the embodiment is described with use of FIGS. 12 to 14. First, an entire flow of temperature estimation processing according to the embodiment of the present disclosure is described with use of FIG. 12. FIG. 12 is a flowchart illustrating a flow of the temperature estimation processing according to the embodiment of the present disclosure.

As illustrated in FIG. 12, the temperature estimation device 100 acquires a photographed image photographed by the photographing section 110 (step S101). Next, the temperature estimation device 100 stores a temperature initial value in the temperature register 141 (step S102).

The temperature estimation device 100 then reads the correction parameter stored in the correction parameter storing section 121 (step S103). The temperature estimation device 100 generates the first corrected image on the basis of the read correction parameter and the initial temperature stored in the temperature register 141 (step S104). It is to be noted that corrected image generation processing is described in detail later.

The temperature estimation device 100 outputs information about the generated first corrected image (such as a light amount (a luminance value) of each pixel), and holds the outputted information (step S105).

Next, the temperature estimation device 100 adds (increments) a temperature of the temperature register 141, and generates the second corrected image (step S106). The temperature estimation device 100 outputs information about the second corrected image, and holds the outputted information, similarly to the first corrected image (step S107).

Further, the temperature estimation device 100 adds the temperature of the temperature register 141 (step S108). The temperature estimation device 100 then generates the third corrected image with use of the added temperature (step S109). The temperature estimation device 100 executes peak determination processing on the basis of information about three generated corrected images (step S110). It is to be noted that the peak determination processing is described in detail later.

The temperature estimation device 100 determines whether or not a result of the peak determination processing is "true" (step S111). In a case where the result of the peak determination processing is not "true" (step S111; No), the temperature estimation device 100 returns to processing in the step S108, and repeats processing for generating a corrected image on the basis of a newly added temperature.

In contrast, in a case where the result of the peak determination processing is "true" (step S111: Yes), the temperature estimation device 100 estimates the housing temperature on the basis of a result of peak determination (step S112).

Next, a detailed flow of the generation processing according to the embodiment of the present disclosure is described with use of FIG. 13. FIG. 13 is a flowchart illustrating a flow of the generation processing according to the embodiment of the present disclosure. The processing in FIG. 13 is executed in the step S104 illustrated in FIG. 12. It is to be noted that the processing in FIG. 13 is similarly executed also in the steps S106 and the step S109 illustrated in FIG. 12.

As illustrated in FIG. 13, the temperature estimation device 100 secures an image region having the same size as the photographed image (step S201). The temperature estimation device 100 then sets initial values of coordinates that are one of pixels in the corrected image (step S202). For example, the temperature estimation device 100 sets coordinates (0, 0) as the initial values.

The temperature estimation device 100 calculates an outside light component of coordinates at coordinates that are a processing target on the basis of the correction parameter (step S203). This makes it possible for the temperature estimation device 100 to correct deviations of a gain and an offset at the coordinates.

Here, the temperature estimation device 100 determines whether or not processing on all the coordinates in the image region is completed (step S204). In a case where the processing on all the coordinates is not completed (step S204; No), the temperature estimation device 100 adds or subtracts an x-coordinate or a y-coordinate, and moves to coordinates that are the next processing target (step S205). The temperature estimation device 100 then repeats processing in the step S203.

In contrast, in a case where the temperature estimation device 10 determines that the processing on all the coordinates in the image region is completed in the step S204 (the step S204; Yes), the temperature estimation device 100 determines that the corrected image generation processing is completed, and proceeds to step S105 in FIG. 12.

Next, a detailed flow of the peak determination processing according to the embodiment of the present disclosure is described with use of FIG. 14. FIG. 14 is a flowchart illustrating a flow of the peak determination processing according to the embodiment of the present disclosure. The processing in FIG. 13 is executed in the step S110 illustrated in FIG. 12.

First, the temperature estimation device 100 stores, in the evaluation value pair register 142, a shading evaluation value calculated on the basis of information about the first corrected image outputted in the step S105 in FIG. 12, and a temperature corresponding to the shading evaluation value (step S301).

Similarly, the temperature estimation device 100 stores, in the evaluation value pair register 142, a shading evaluation value calculated on the basis of information about the second corrected image outputted in the step S107 in FIG. 12, and a temperature corresponding to the shading evaluation value (step S302).

Similarly, the temperature estimation device 100 stores, in the evaluation value pair register 142, a shading evaluation value calculated on the basis of information about the third corrected image outputted in the step S109 in FIG. 12, and a temperature corresponding to the shading evaluation value (step S303).

The temperature estimation device 100 then determines whether or not the peak is present among the three shading evaluation values in the evaluation value pair register 142 (step S304).

It is to be noted that the peak being present among the three shading evaluation indicates a case where a relationship in which a first value is larger than a second value and a third value is larger than the second value is established, that is, a relationship in which the second value is the minimum value among three consecutive numeric values. This is because it is possible to represent the shading evaluation value by a downward convex quadratic function. This respect is described in detail with use of FIG. 15.

FIG. 15 is a graph illustrating relations between a standard deviation and an error in the estimated temperature of housing in the peak determination processing. Specifically, a graph 90 illustrated in FIG. 15 illustrates relations between the estimated temperature of the housing 111 estimated by the temperature estimation device 100 and a standard deviation at the estimated temperature.

For example, it is assumed that the temperature estimation device 100 sets 35° C. as the initial temperature. At this time, the temperature estimation device 100 assumes that the temperature of the housing 111 is 35° C., and calculates a standard deviation (in other words, a shading evaluation value) in a corrected image.

In addition, as described in FIG. 14, the temperature estimation device 100 calculates a standard deviation corresponding to each of temperatures including 36° C. and 37° C. that are set in increments of 1° C. from the initial temperature. The temperature estimation device 100 then plots values of respective standard deviations on the graph 90.

In a case where these three numeric values are compared with one another, as illustrated in FIG. 15, the standard deviation at 37° C. is the minimum value, which means that the relationship in which "the first value is larger than the second value and the third value is larger than the second value" is not established. Accordingly, the temperature estimation device 100 further increments the temperature, and calculates a standard deviation at 38° C.

The temperature estimation device 100 then plots values of the respective standard deviations at 36° C., 37° C. and 38° C. on the graph 90, and compares three numeric values with one another. In this case, as illustrated in FIG. 15, the standard deviation at 37° C. is the minimum value, and the relationship in which "the first value is larger than the second value and the third value is larger than the second value" is established. At this time, 37° C. is a temperature that minimizes shading; therefore, the temperature estimation device 100 estimates that the temperature of the housing 111 is 37° C. It is to be noted that in FIG. 15, for description, standard deviations at 39° C. and higher temperatures are plotted on the graph 90; however, in a case where the temperature estimation device 100 has been able to estimate the temperature that minimizes shading, the temperature estimation device 100 may not calculate a standard deviation at a temperature higher than the estimated temperature.

Description is continued with reference to FIG. 14 again. In a case where the peak is present among the shading evaluation values (step S304; Yes), the temperature estimation device 100 outputs "true" as a result of peak determination (step S305). Thereafter, the temperature estimation device 100 executes processing in the step S112 in FIG. 12.

In contrast, in a case where no peak is present among the shading evaluation values (step S304: No), the temperature estimation device 100 outputs "false" as a result of peak determination (step S306). The temperature estimation device 100 then shifts values stored in the evaluation value pair register 142 by one (step S307). Specifically, the temperature estimation device 100 deletes the oldest value (for example, an evaluation value pair acquired from the first corrected image), and changes a second evaluation value pair as the first value, and stores the second evaluation value pair as the first value in the evaluation value pair register 142. In addition, the temperature estimation device 100 changes a third evaluation value pair as the second value, and stores the third evaluation value pair as the second value in the evaluation value pair register 142. Thereafter, the temperature estimation device 100 stores a newly outputted evaluation value pair (a value outputted in the step S109 in FIG. 12) as the third value in the evaluation value pair register 142, and repeats processing for determining the peak from three stored values.

[1-6. Modification Examples of Embodiment]

The above-described embodiment has described an example in which the temperature estimation device 100 is a lensless form infrared camera. However, the temperature estimation device 100 is not necessarily a lensless form infrared camera. That is, the above-described temperature estimation processing is also applicable to any of cameras that capture non-visible light other than infrared light. In addition, the above-described temperature estimation processing is applicable not only to the lensless form camera but also a lens camera.

In addition, the above-described embodiment has described an example in which the temperature estimation device 100 is integrated with the photographing section 110. However, the temperature estimation device 100 and the photographing section 110 may be configured as different devices. For example, the temperature estimation device 100 may include an information processing terminal, a cloud server, or the like that acquires a photographed image from the photographing section 110 that is a lensless camera via a network or the like.

2. Other Embodiments

Among the processes described in the above embodiment, all or part of the process described as being performed automatically may also be manually performed, or all or part of the process described as being performed manually may also be performed automatically by a known method. In addition to this, the processing steps, specific names, and information including various data and parameters illustrated in the above specification and in the drawings may be freely changed, unless otherwise noted. For example, various information illustrated in the drawings is not limited to the illustrated information.

In addition, the illustrated components of each device are functional concepts and do not necessarily have to be physically configured as illustrated. That is, a specific form of the distribution and integration of each device is not limited to the illustrated one, and all or part thereof may be functionally or physically distributed and integrated in any unit depending on various loads, use situations, etc.

In addition, it is possible to appropriately combine the embodiments and the modification examples described above within a scope that does not cause contradiction in the processing contents.

In addition, the effects described herein are merely illustrative and not limitative, and other effects may be achieved.

3. Hardware Configuration Example

An information device such as the temperature estimation device 100 according to the embodiment described above is implemented by a computer 1000 having a configuration as illustrated in FIG. 16, for example. The following description is given with use of the temperature estimation device 100 according to the embodiment as an example. FIG. 16 illustrates a hardware configuration diagram illustrating an example of the computer 1000 that implements a function of the temperature estimation device 100. The computer 1000 includes a CPU 1100, a RAM 1200, a ROM (Read Only Memory) 1300, a HDD (Hard Disk Drive) 1400, a communication interface 1500, and an input/output interface 1600. Respective components of the computer 1000 are coupled to each other through a bus 1050.

The CPU 1100 operates on the basis of a program stored in the ROM 1300 or the HDD 1400, and controls the respective components. For example, the CPU 1100 expands a program stored in the ROM 1300 or the HDD 1400 on the RAM 1200, and executes processing corresponding to various kinds of programs.

The ROM 1300 stores a boot program such as BIOS (Basic Input Output System) to be executed by the CPU 1100 on startup of the computer 1000, a program depending on hardware of the computer 1000, and the like.

The HDD 1400 is a computer-readable recording medium that non-transitorily records a program to be executed by the CPU 1100, data to be used by the program, and the like. Specifically, the HDD 1400 is a recording medium that records the temperature estimating program according to the present disclosure that is one example of program data 1450.

The communication interface 1500 is an interface for coupling the computer 1000 to an external network 1550 (for example, the Internet). For example, the CPU 1100 receives data from any other device or transmits data generated by the CPU 1100 to any other device through the communication interface 1500.

The input/output interface 1600 is an interface for coupling an input/output device 1650 and the computer 1000 to each other. For example, the CPU 1100 receives data from an input device such as a keyboard and a mouse through the input/output interface 1600. In addition, the CPU 1100 transmits data to an output device such as a display, a speaker, and a printer through the input/output interface 1600. In addition, the input/output interface 1600 may function as a media interface that reads a program and the like recorded on a predetermined recording medium (media). Examples of the media include an optical recording medium such as a DVD (Digital Versatile Disc) and a PD (Phase change rewritable Disk), an optical magnetic recording medium such as an MO (Magneto-Optical disk), a tape medium, a magnetic recording medium, a semiconductor memory, and the like.

For example, in a case where the computer 1000 functions as the temperature estimation device 100 according to the embodiment, the CPU 1100 of the computer 1000 executes the temperature estimating program loaded on the RAM 1200 to implement functions of the controller 130 and the like. In addition, the temperature estimating program according to the present disclosure and data in the storing section 120 are stored in the HDD 1400. It is to be noted that the CPU 1100 reads the program data 1450 from the HDD 1400 for execution; however, as another example, the CPU 1100 may acquire these programs from any other device through the external network 1550.

It is to be noted that the present technology may also have the following configurations.

(1)

A temperature estimation device including:

an acquiring section that acquires a photographed image photographed by a photographing section including an infrared light sensor and a housing;

a generating section that corrects the photographed image with use of a correction parameter and a temporarily set temperature of the housing to generate a corrected image of the photographed image, the correction parameter that is calculated by prior temperature calibration with respect to the photographing section; and an estimating section that estimates a temperature of the housing on the basis of non-uniformity of luminance values of pixels included in the corrected image.

(2)

The temperature estimation device according to (1), in which the estimating section estimates the temperature of the housing on the basis of a value that evaluates non-uniformity of the luminance values.

(3)

The temperature estimation device according to (1) or (2), in which the estimating section estimates the temperature of the housing on the basis of a standard deviation of the luminance values of the pixels included in the corrected image.

(4)

The temperature estimation device according to (3), in which the generating section sets a plurality of temporary temperatures different from each other, and generates a plurality of corrected images corresponding to the respective set temperatures, and the estimating section estimates the temperature of the housing on the basis of a result of comparing standard deviations corresponding to the plurality of respective corrected images.

(5)

The temperature estimation device according to (4), in which in a case where a standard deviation that is lowest is present among the standard deviations corresponding to the plurality of respective corrected images, the estimating section estimates a temperature corresponding to the standard deviation that is lowest as the temperature of the housing, and in a case where the estimating section determines that the standard deviation that is lowest is not present among the standard deviations corresponding to the plurality of perspective corrected images, the generating section further sets a different temperature, and newly generates a corrected image.

(6)

The temperature estimation device according to any one of (1) to (5), further including the photographing section that performs photographing by detecting infrared light by the infrared light sensor.

(7)

The temperature estimation device according to (6), in which the photographing section includes a mask on a light incident surface side of the housing, the mask including each of an open section through which light passes and a closed section through which light does not pass.

(8)

The temperature estimation device according to (6) or (7), in which the photographing section uses a microbolometer (Micro bolometer) as the infrared light sensor.

(9)

A temperature estimating method that is performed by a computer, the method including:

acquiring a photographed image photographed by a photographing section including an infrared light sensor and a housing;

correcting the photographed image with use of a correction parameter and a temporarily set temperature of the housing to generate a corrected image of the photographed image, the correction parameter that is calculated by prior temperature calibration with respect to the photographing section; and estimating a temperature of the housing on the basis of non-uniformity of luminance values of pixels included in the corrected image.

(10)

A temperature estimating program causing a computer to function as:

an acquiring section that acquires a photographed image photographed by a photographing section including an infrared light sensor and a housing;

a generating section that corrects the photographed image with use of a correction parameter and a temporarily set temperature of the housing to generate a corrected image of the photographed image, the correction parameter that is calculated by prior temperature calibration with respect to the photographing section; and an estimating section that estimates a temperature of the housing on the basis of non-uniformity of luminance values of pixels included in the corrected image.

REFERENCE SIGNS LIST

1: calibration system
100: temperature estimation device
110: photographing section
120: storing section
121: correction parameter storing section
122: initial temperature storing section
130: controller
131: acquiring section
132: generating section
133: calculating section
134: peak determining section
135: estimating section
136: correcting section
141: temperature register
142: evaluation value pair register

The invention claimed is:

1. A temperature estimation device comprising:
an acquiring section that acquires a photographed image photographed by a photographing section including an infrared light sensor and a housing;
a generating section that corrects the photographed image with use of a correction parameter and a temporarily set temperature of the housing to generate a corrected image of the photographed image, the correction parameter that is calculated by prior temperature calibration with respect to the photographing section; and
an estimating section that estimates a temperature of the housing on a basis of non-uniformity of luminance values of pixels included in the corrected image.

2. The temperature estimation device according to claim 1, wherein the estimating section estimates the temperature of the housing on a basis of a value that evaluates non-uniformity of the luminance values.

3. The temperature estimation device according to claim 2, wherein the estimating section estimates the temperature of the housing on a basis of a standard deviation of the luminance values of the pixels included in the corrected image.

4. The temperature estimation device according to claim 3, wherein
the generating section sets a plurality of temporary temperatures different from each other, and generates a plurality of corrected images corresponding to the respective set temperatures, and
the estimating section estimates the temperature of the housing on a basis of a result of comparing standard deviations corresponding to the plurality of respective corrected images.

5. The temperature estimation device according to claim 4, wherein
in a case where a standard deviation that is lowest is present among the standard deviations corresponding to the plurality of respective corrected images, the estimating section estimates a temperature corresponding to the standard deviation that is lowest as the temperature of the housing, and
in a case where the estimating section determines that the standard deviation that is lowest is not present among the standard deviations corresponding to the plurality of perspective corrected images, the generating section further sets a different temperature, and newly generates a corrected image.

6. The temperature estimation device according to claim 1, further comprising the photographing section that performs photographing by detecting infrared light by the infrared light sensor.

7. The temperature estimation device according to claim 6, wherein the photographing section includes a mask on a light incident surface side of the housing, the mask including each of an open section through which light passes and a closed section through which light does not pass.

8. The temperature estimation device according to claim 6, wherein the photographing section uses a microbolometer (Micro bolometer) as the infrared light sensor.

9. A temperature estimating method that is performed by a computer, the method comprising:
- acquiring a photographed image photographed by a photographing section including an infrared light sensor and a housing;
- correcting the photographed image with use of a correction parameter and a temporarily set temperature of the housing to generate a corrected image of the photographed image, the correction parameter that is calculated by prior temperature calibration with respect to the photographing section; and
- estimating a temperature of the housing on a basis of non-uniformity of luminance values of pixels included in the corrected image.

10. A temperature estimating program causing a computer to function as:
- an acquiring section that acquires a photographed image photographed by a photographing section including an infrared light sensor and a housing;
- a generating section that corrects the photographed image with use of a correction parameter and a temporarily set temperature of the housing to generate a corrected image of the photographed image, the correction parameter that is calculated by prior temperature calibration with respect to the photographing section; and
- an estimating section that estimates a temperature of the housing on a basis of non-uniformity of luminance values of pixels included in the corrected image.

* * * * *